US008711272B2

(12) United States Patent
Noto et al.

(10) Patent No.: US 8,711,272 B2
(45) Date of Patent: Apr. 29, 2014

(54) IMAGE STABILIZATION APPARATUS AND IMAGE PICKUP APPARATUS

(75) Inventors: Goro Noto, Tokyo (JP); Shinichi Masuda, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 13/263,465

(22) PCT Filed: Apr. 23, 2010

(86) PCT No.: PCT/JP2010/057729
§ 371 (c)(1),
(2), (4) Date: Oct. 7, 2011

(87) PCT Pub. No.: WO2010/143485
PCT Pub. Date: Dec. 16, 2010

(65) Prior Publication Data
US 2012/0038783 A1    Feb. 16, 2012

(30) Foreign Application Priority Data

Jun. 11, 2009   (JP) .................................. 2009-140255

(51) Int. Cl.
*H04N 5/235*   (2006.01)
*H04N 5/228*   (2006.01)

(52) U.S. Cl.
USPC .................... 348/345; 348/208.2; 348/305

(58) Field of Classification Search
USPC ........................ 348/208.2, 208.4, 305, 345
See application file for complete search history.

(56) References Cited

U.S. PATENT DOCUMENTS

| 5,155,520 A | 10/1992 | Nagasaki et al. |
| 5,606,456 A | 2/1997 | Nagata et al. |
| 6,047,132 A | 4/2000 | Maeda |
| 7,460,772 B2 | 12/2008 | Ishikawa et al. |

(Continued)

FOREIGN PATENT DOCUMENTS

| EP | 0579137 A2 | 1/1994 |
| EP | 1607792 A | 12/2005 |

(Continued)

OTHER PUBLICATIONS

The above reference (Foreign Patent Document) were cited in a Sep. 20, 2012 European Office Action which is enclosed of the counterpart European Patent Application No. 10786016.5.

(Continued)

*Primary Examiner* — Hung Lam
(74) *Attorney, Agent, or Firm* — Cowan, Liebowitz & Latman, P.C.

(57) ABSTRACT

An image stabilizer has a shooting optical system shooting an object whose principal point moves between first and second principal points in an optical axis direction, an acceleration detector detecting acceleration applied to the image stabilizer and disposed between the first and second principal points in the optical axis direction. An angular velocity detector detecting angular velocity applied to the image stabilizer, an acceleration detector disposed between principal points for proximity and infinity shootings and detecting acceleration applied to the image stabilizer, a rotation angular velocity calculator calculating rotation angular velocity component around the principal point of the shooting optical system based on the angular velocity detector, a revolution angular velocity calculator calculating revolution angular velocity component around the object based on the acceleration detector and the rotation angular velocity calculator, and a controller performing image stabilization control based on a difference between the rotation and revolution angular velocity components.

16 Claims, 22 Drawing Sheets

(56) References Cited

U.S. PATENT DOCUMENTS

| | | | |
|---|---|---|---|
| 8,159,746 B2 * | 4/2012 | Suzuki | 359/557 |
| 8,199,243 B2 * | 6/2012 | Miyazaki et al. | 348/335 |
| 8,319,841 B2 * | 11/2012 | Matsuzaki et al. | 348/208.4 |
| 8,582,016 B2 * | 11/2013 | Chung et al. | 348/345 |
| 2002/0097324 A1 * | 7/2002 | Onuki | 348/208 |
| 2005/0276590 A1 | 12/2005 | Ishikawa et al. | |
| 2008/0055457 A1 * | 3/2008 | Nakahara | 348/335 |
| 2009/0128638 A1 * | 5/2009 | Okada | 348/208.2 |

FOREIGN PATENT DOCUMENTS

| | | |
|---|---|---|
| EP | 1607792 A2 | 12/2005 |
| EP | 1686792 A2 | 8/2006 |
| JP | 62-153816 A | 7/1987 |
| JP | 07-225405 A | 8/1995 |
| JP | 2004-295027 A | 10/2004 |
| JP | 2006-091279 A | 4/2006 |
| JP | 2006-208691 A | 8/2006 |
| JP | 2007-034141 A | 2/2007 |
| JP | 2007-171786 A | 7/2007 |

OTHER PUBLICATIONS

The above references were cited in a Supplementary European Search Report issued on Apr. 17, 2012, a copy of which is enclosed, that issued in the corresponding European Patent Application No. 10786016.5.

PCT/IB/326 (PCT Notification Concerning Transmittal of Copy of International Preliminary Report on Patentability).

PCT/IB/373 (PCT International Preliminary Report on Patentability).

PCT/ISA/237 (PCT Written Opinion of the International Searching Authority).

* cited by examiner

ERROR RATIO FUNCTION f(θ ba)
ACCELEROMETER AT MAGNIFICATION OF 0.5
(VARIABLE: ra AND θ a··)

ERROR RATIO FUNCTION f(θ ba)
ACCELEROMETER AT MAGNIFICATION OF EQUAL
(VARIABLE: ra AND θ a··)

ERROR RATIO FUNCTION f($\theta$ ba)
ACCELEROMETER AT MAGNIFICATION OF ∞
(VARIABLE: ra AND $\theta$ a··)

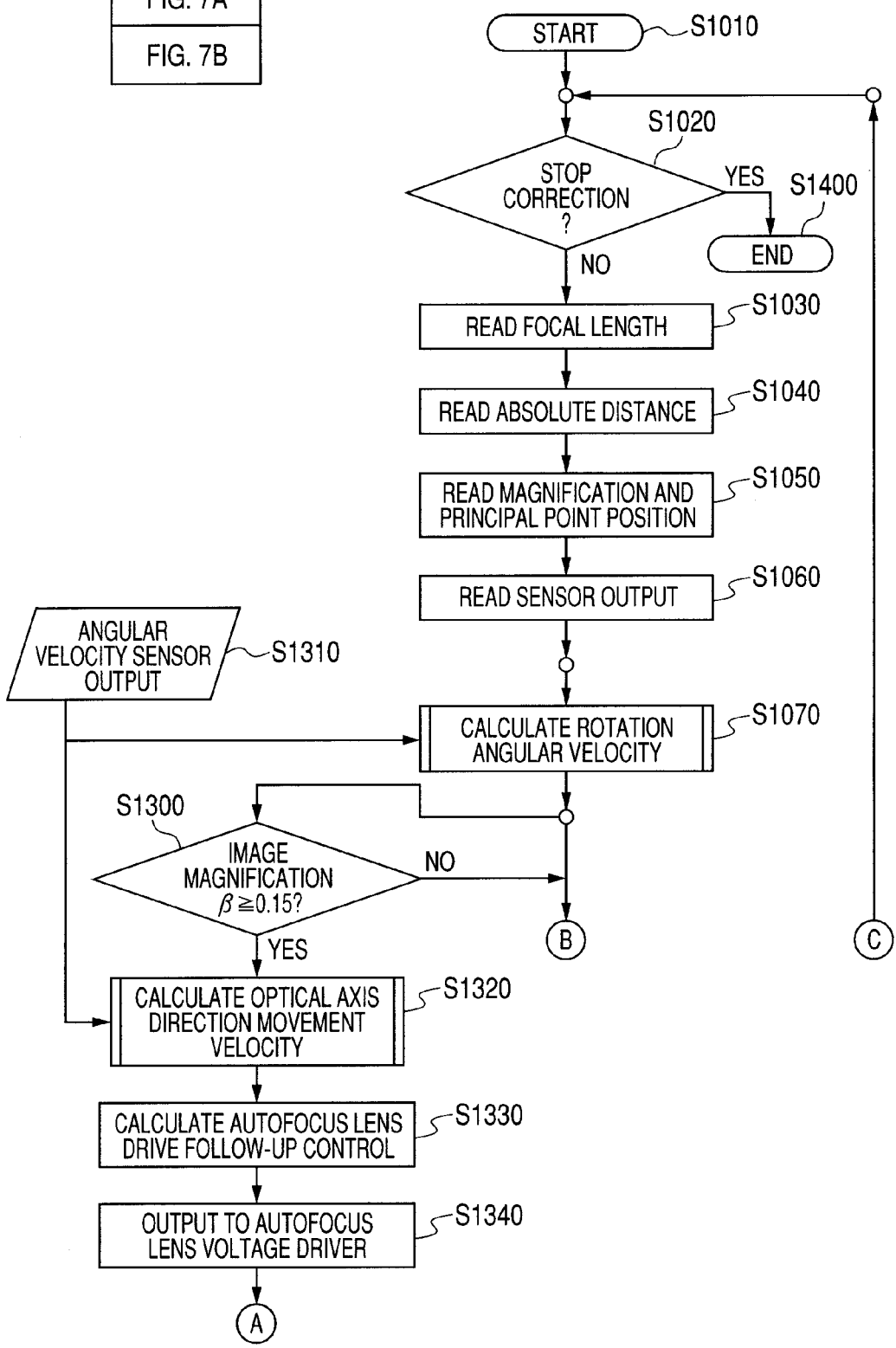

FIXED COORDINATE SYSTEM O-XY

SHOOTING FREQUENCY

ERROR RATIO FUNCTION f($\theta$ ba)
ACCELEROMETER AT MAGNIFICATION OF 0.5
(VARIABLE: ra AND $\theta$ a··)

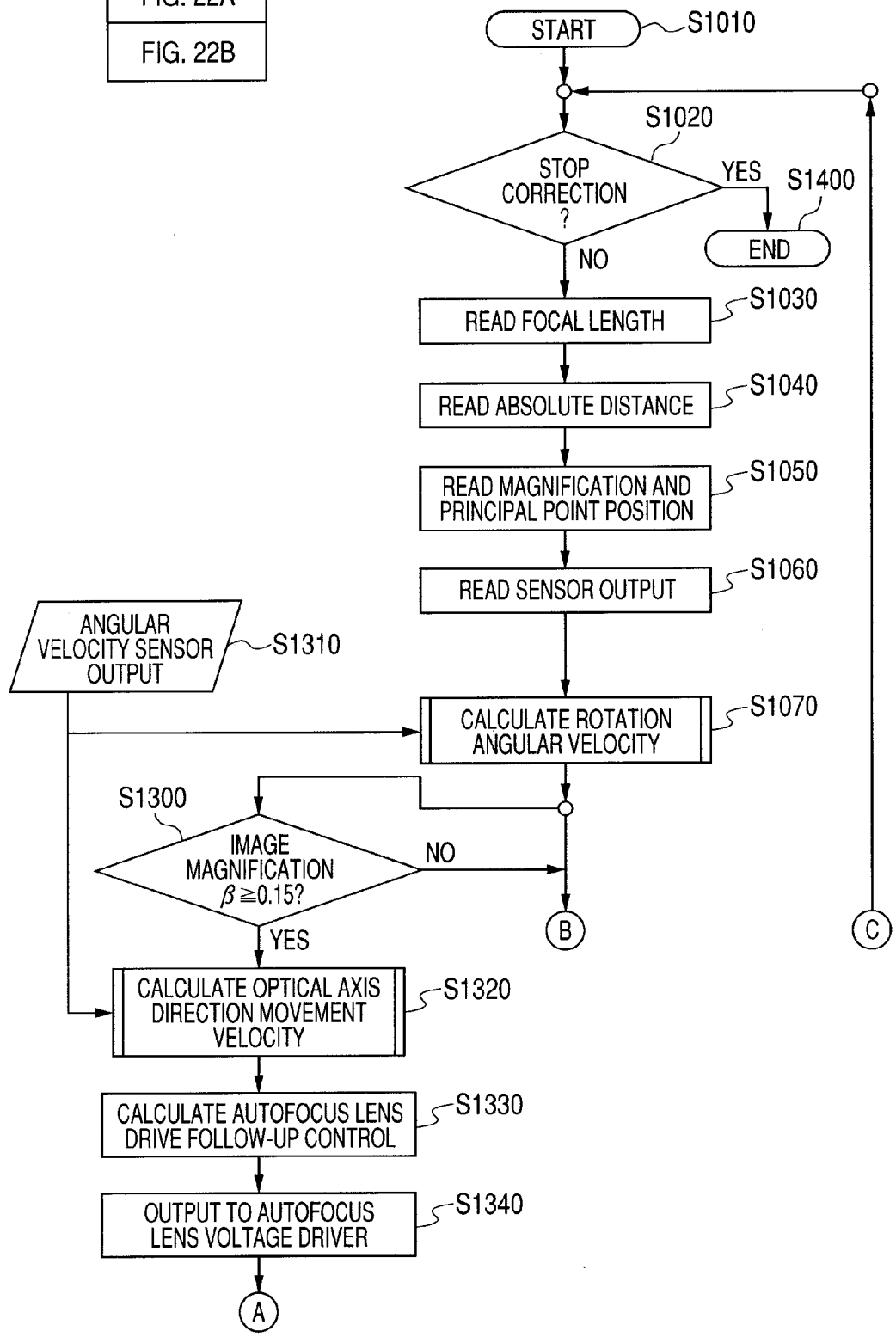

IMAGE STABILIZATION APPARATUS AND IMAGE PICKUP APPARATUS

CROSS-REFERENCE TO RELATED APPLICATIONS

This application is a national stage application of International Application No. PCT/JP2010/057729, filed Apr. 23, 2010 whose benefit is claimed and which claims the benefit of Japanese Patent Application No. 2009-140255, filed Jun. 11, 2009, whose benefit is also claimed.

TECHNICAL FIELD

The present invention relates to an image stabilization apparatus which prevents deterioration of a shot image by correcting an image blur due to shake, and an image pickup apparatus including the image stabilization apparatus.

BACKGROUND ART

FIG. 23 is a view showing an outline of an image stabilization apparatus included in the conventional camera. A shake which occurs to the camera has six degrees of freedom in total, which are rotational movements of three degrees of freedom constituted of pitching, yawing and rolling movement, and translation movements of three degrees of freedom constituted of movements in an X-axis, a Y-axis and a Z-axis directions. The image stabilization apparatuses which are commercialized at present usually corrects the image blur due to the rotational movements of two degrees of freedom constituted of pitching and yawing movements.

Movement of camera is monitored by an angular velocity sensor 130. As the angular velocity sensor, a piezoelectric vibration angular velocity sensor that detects a Coriolis force which is caused by rotation is generally used. The angular velocity sensor 130 contains three detectors which perform detection of pitching movement that is the rotation around the Z-axis in FIG. 23, detection of yawing movement that is the rotation around the Y-axis in FIG. 23, and detection of rolling movement that is the rotation around the X-axis (optical axis) in FIG. 23.

When an image blur due to shake is to be corrected, output of the angular velocity sensor 130 is sent to a lens CPU 106, and a target drive position of a correcting lens 101 for image stabilization is calculated. In order to drive the correcting lens 101 to the target drive position, instruction signals are sent to voltage drivers 161x and 161y, and the voltage drivers 161x and 161y follow the instruction signals, and drive lens drivers 120x and 120y. The position of the correcting lens 101 is monitored by lens position detectors 110x and 110y, and is fed back to the lens CPU 106. The lens CPU 106 performs positional control of the correcting lens 101 based on the target drive position and the position of the correcting lens 101. By driving the correcting lens according to the shake like this, image blur caused by shake can be corrected.

However, in the aforementioned image stabilization apparatus, detection of movement of camera due to shake is performed by only the angular velocity sensor 130, and therefore, the angular movement (rotational movement) can be monitored, but movement which causes the optical axis to move parallel vertically or laterally (hereinafter, referred to as parallel movement) cannot be monitored. Accordingly, image stabilization can be performed only for the movements of the two degrees of freedom constituted of pitching and yawing movements.

Here, about the image blur caused by a parallel movement, the case of performing shooting by using a micro lens with a focal length of 100 mm will be described as an example. When a landscape at infinity distance is shot by using this lens, if the angular velocity sensor output substantially 0.8 deg/s, the image plane moving velocity is about 1.40 mm/s (=100×sin 0.8) from the focal length. Therefore, the width of the movement of the image plane due to angular movement when shooting with an exposure time of 1/15 second becomes 93 μm (=1.40 mm/15). Further, if the entire camera is moved parallelly in the vertical direction at 1.0 mm/s in addition to the angular movement, shooting is not influenced by the parallel movement velocity component, and an image blur due to parallel movement does not occur, since in the case of infinity shooting, the shooting magnification β is substantially zero.

However, when close-up shooting is performed for shooting a flower or the like, the shooting magnification is very large, and the influence of parallel movement cannot be ignored. For example, when the shooting magnification is equal-magnification (β=1), and the moving velocity in the vertical direction is 1 mm/s, the image on the image plane moves also in velocity of 1 mm/s. The movement width in the image plane at the time of performing shooting with an exposure time of 1/15 second becomes 67 μm, and the image blur due to parallel movement cannot be ignored.

Next, a general method (model and mathematical expression) which expresses the movement of an object in a space in a field of physics and engineering will be described. Here, about the model expressing movement of the object on a plane, an ordinary object will be described for facilitating description. In this case, if the three degrees of freedom of the object are defined, the movement and the position of the object can be uniquely defined.

The first one is the model expressing a parallel movement and a rotational movement (see FIGS. 24A and 24B). In a fixed coordinate system O-XY in a plane with the axis of abscissa set as an X-axis and the orthogonal axis set as a Y-axis, the position of the object can be determined if defining the three degrees of freedom: a position X(t) in the X-axis direction; a position Y(t) in the Y-axis direction; and the rotational angle θ(t) of the object itself are specified as shown in FIG. 24A. The movement of the object (velocity vector) can be expressed by three components of an X-axis direction translation velocity Vx(t) and a Y-axis direction translation velocity Vy(t) of a reference point (principal point O2) set on the object, and a rotation angular velocity $\dot{\theta}(t)$ around the reference point on the object as shown in FIG. 24B. This model is the commonest.

The second one is the model expressing an instantaneous center of rotation and a rotation radius (see FIG. 25). In the fixed coordinate system O-XY in an XY plane, the object is assumed to be rotating at a rotation velocity $\dot{\theta}(t)$ with a rotation radius R(t) around a certain point f(t)=(X(t), Y(t)) being set as an instantaneous center of rotation, at a certain instant. Like this, the movement within the plane can be expressed by a locus f(t) of the instantaneous center of rotation and the rotation velocity $\dot{\theta}(t)$ at the instant. This model is often used in the analysis of a link mechanism in mechanics.

In recent years, cameras equipped with a function of correcting a parallel movement are proposed in Japanese Patent Application Laid-Open No. H07-225405 and Japanese Patent Application Laid-Open No. 2004-295027. It can be said that in Japanese Patent Application Laid-Open No. H07-225405, the movement of camera in a three-dimensional space is expressed by a translation movement and a rotation movement based on the measurement values of three accelerometers and three angular velocity sensors.

Further, in Japanese Patent Application Laid-Open No. 2004-295027, in the movement of camera including angular movement and parallel movement, as illustrated in FIG. 2 of the Patent Document, a distance n of the rotational center from the focal plane is calculated. In mathematical expression 1 of Japanese Patent Application Laid-Open No. 2004-295027, the angular movement amount which occurs when the focal plane is set as the rotation center is calculated in the first half part, and the parallel movement amount which occurs due to translation movement is calculated in the latter half part. The parallel movement amount of the latter half part is a correction term which is considered by being replaced with rotation in the position alienated from the focal plane by a distance n. The method for obtaining the position n of the rotation center in FIG. 3 in Japanese Patent Application Laid-Open No. 2004-295027 uses the concept of an instantaneous center which is frequently used in the mechanics, as the model expressing the movement in the space. This is the idea that the movement in the space can be expressed by a succession of the rotational movement, that is, the movement in the space is a rotational movement with a certain radius with a certain point as the center at the instant, and is the rotational movement of the radius with the next certain point as the center at the next instant. Therefore, it can be said that in Japanese Patent Application Laid-Open No. 2004-295027, the movement of camera due to shake is modeled as a succession of the rotational movement having the instantaneous center.

However, the method described in Japanese Patent Application Laid-Open No. H07-225405 has the problem that the calculation amount for obtaining the blur amount in the image plane becomes tremendous, and the algorithm of calculation becomes very complicated. Further, the correction calculation with respect to the optical axis direction blur (out of focus) is not mentioned. Further, it can be said that in Japanese Patent Application Laid-Open No. 2004-295027, movement of camera is modeled as a succession of the rotational movement having the instantaneous center of rotation as described above, and the problem of the model and the mathematical expression is that as described in paragraph [0047] of Japanese Patent Application Laid-Open No. 2004-295027 by itself, in the case of $F1 \approx F2$ (the forces applied to two accelerometers), the rotation center position n becomes $\infty$, and calculation cannot be performed. Further, the fact that the rotation center position n is $\infty$ means that the movement due to the angle in the pitching direction or in the yawing direction is absent, and this movement cannot be detected by the angular velocity sensor. The correction amount can be calculated by using the output of the two acceleration sensors, but the precision is low and the calculation amount becomes tremendous. Further, by the mathematical expression in this case, the correction calculation of the movement in the optical axis direction cannot be made.

Further, with change in principal point position of the shooting optical system, the correction error component which will be described later is output from the acceleration sensor (accelerometer), but Japanese Patent Application Laid-Open No. H07-225405 and Japanese Patent Application Laid-Open No. 2004-295027 do not have any corresponding technical disclosure.

DISCLOSURE OF THE INVENTION

The present invention is made in view of the aforementioned problems, and has an object to provide an image stabilization apparatus and an image pickup apparatus which enable accurate image stabilization without a control failure, reduces a calculation amount, and can minimize an error amount accompanying a change in principal point position of a shooting optical system, in whatever state an angular movement and a parallel movement coexist.

In order to attain the aforementioned object, an image stabilization apparatus according to an embodiment of the present invention adopts a constitution characterized by having a shooting optical system that shoots an object, in which a principal point of the shooting optical system moves to a second principal point position from a first principle position in an optical axis direction of the shooting optical system, and an acceleration detector that detects an acceleration which is applied to the image stabilization apparatus and outputs the acceleration and is disposed between the first principal point position and the second principal point position in the optical axis direction of the shooting optical system.

The other objects and features of the present invention will become apparent from the following description and drawings.

DESCRIPTION OF THE EMBODIMENTS

Modes for carrying out the present invention are as shown in the following embodiments 1 to 3.

Embodiment 1

In the following embodiment, the shake movement of the camera held by human hands, and an image movement which occurs on an image plane as a result of the shake movement of the camera will be expressed by "rotation revolution movement expression" with the movement model expressed by a rotation movement and a revolution movement and a geometrical-optical expression being combined.

The present embodiment is an image stabilization apparatus which calculates a camera movement from the measured values of an accelerometer and an angular velocity sensor, and the rotation revolution movement expression, and further calculates an image movement. By performing drive control of a part or whole of the shooting lens or a part or whole of the image pickup device based on a calculated value of the image movement, the image blur is corrected. Alternatively, the present invention provides an image stabilization apparatus which corrects an image blur by performing image processing of a shot image based on the calculated value of the image movement obtained from the rotation revolution movement expression.

Figure 1:
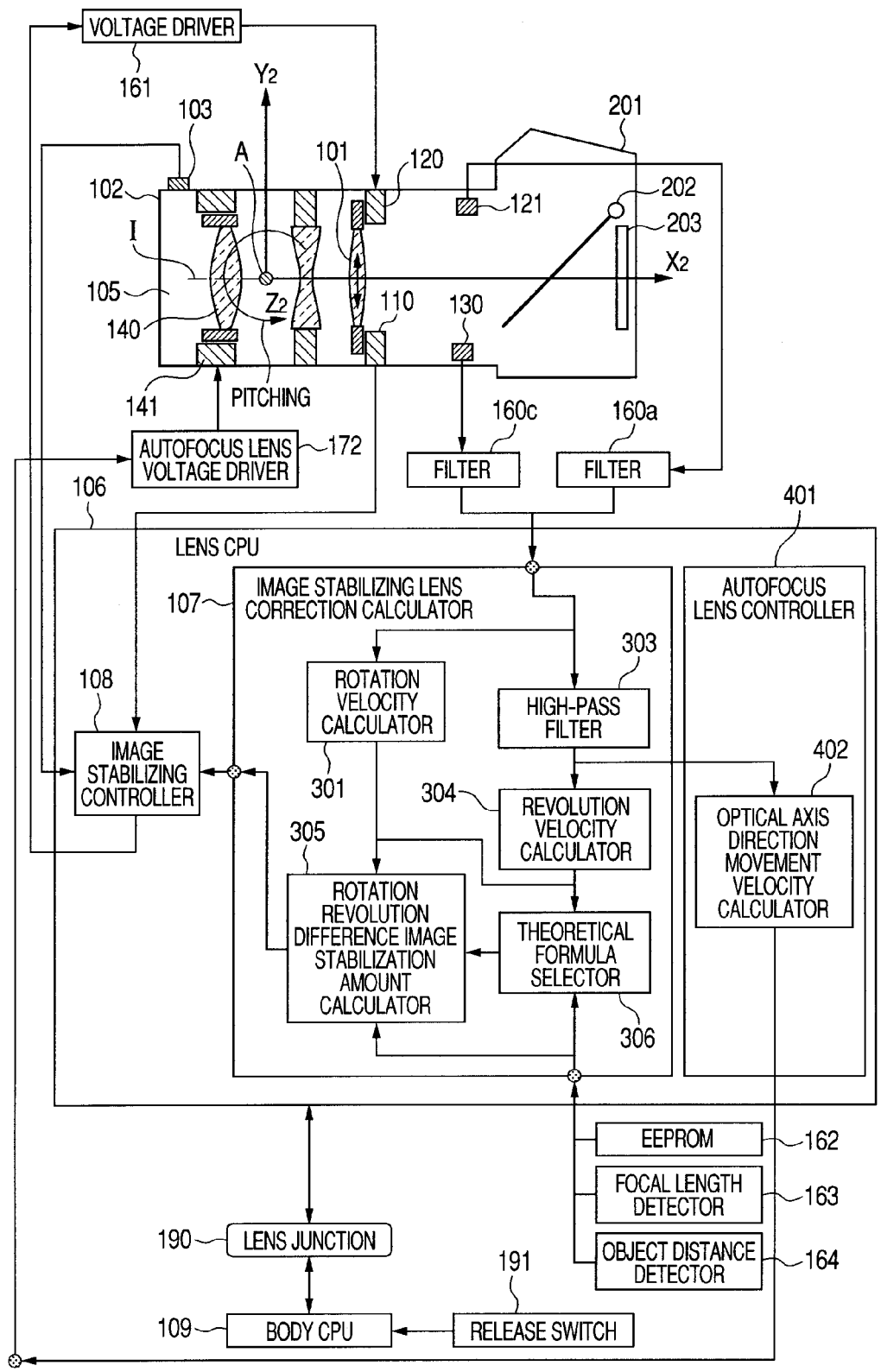
FIG. 1 is a block diagram illustrating a main part of an image pickup apparatus that is embodiment 1 according to the present invention.

FIG. 1 is a block diagram illustrating a main part of an image pickup apparatus (camera system) including an image stabilization apparatus according to embodiment 1 of the present invention. The parts which performs the same functions as in the prior art are assigned with the same reference numerals and characters, and the redundant descriptions will be properly omitted.

An image stabilization apparatus according to the embodiment 1 is provided in a lens-barrel 102 attachable to and detachable from a camera body 201, and performs blur correction with respect to the directions of five degrees of freedom of pitching (rotation around an $Z_2$-axis), yawing (rotation around $Y_2$-axis), an $Y_2$-axis direction, a $Z_2$-axis direction and an $X_2$-axis (optical axis) direction. However, in FIG. 1 and the following description, an image stabilization system in the pitching rotation and the $Y_2$-axis direction, and an optical axis direction image stabilization system in the $X_2$-axis (optical axis) direction are shown, and an image stabilization system in the yawing rotation and the $Z_2$-axis direction is the same as the image stabilization system of the pitching rotation and the $Y_2$-axis direction.

An angular velocity sensor 130 is an angular velocity detector which is floatingly supported with respect to the lens barrel 102, and detects the angular velocity of the movement which occurs to the camera body 201 (lens barrel 102). The angular velocity sensor 130 according to the embodiment 1 is a piezoelectric vibration angular velocity sensor that detects Coriolis force which is generated by rotation. The angular velocity sensor 130 is an angular velocity sensor internally having sensitivity axes for three axis rotation of pitching, yawing and rolling. The reason why the angular velocity sensor 130 is floatingly supported is to eliminate the influence of mechanical vibration accompanying the mechanism operation of the camera as much as possible. The angular velocity sensor 130 outputs an angular velocity signal corresponding to a detected angular velocity to a filter 160c.

An accelerometer 121 is an acceleration detector that detects the acceleration of the movement which occurs to the camera body 201 (lens barrel 102). The accelerometer 121 according to the embodiment 1 is a triaxial accelerometer having three sensitivity axes with respect to the three directions of the X-axis, Y-axis and Z-axis, and is floatingly supported by the lens barrel 102. The accelerometer 121 is floatingly supported for the same reason as the case of the angular velocity sensor 130. Further, the accelerometer 121 is a triaxial acceleration sensor (acceleration sensor using a weight) in the present embodiment, and the frequency characteristics of two axes are equally high, but the characteristic of the remaining one axis is low. Therefore, in order to detect the accelerations in the $Y_2$-axis direction and the $Z_2$-axis direction orthogonal to the optical axis, the two axes with high sensitivity are used, and the one axis low in characteristic is aligned with the $X_2$-axis (optical axis direction). This is for precisely detecting the accelerations in the $Y_2$-axis direction and the $Z_2$-axis direction which have a large influence on image blur correction.

The output of the accelerometer 121 is A/D-converted after passing through a low pass filter (LPF) such as a filter 160a or the like, and is input to an IS (image stabilizing) lens correction calculator 107 in a lens CPU 106. The accelerometer 121 may be mounted to a movable mirror frame which moves in the optical axis direction during zooming or the like, a frame that holds the other optical system, or a unit in an optical system such as a stop, but in such a case, it is necessary to enable the position of the accelerometer 121 with respect to the principal point position after zooming to be detected.

Further, the angular velocity sensor 130 is of a vibratory gyro type as described above, and vibrates at 26 KHz. Accordingly, if these sensors are mounted on the same substrate, the accelerometer 121 is likely to pick up the vibration noise, and therefore, the accelerometer 121 and angular velocity sensor 130 are mounted on separate substrates.

An image stabilizing lens driver 120 is a driver (actuator) which generates a drive force for driving a correcting lens 101 for correction of the image blur within the plane (within the $Y_2Z_2$ plane) perpendicular to an optical axis I. The image stabilizing lens driver 120 generates a drive force in the $Y_2$-axis direction, and drives the correcting lens 101 when a coil not illustrated is brought into an energized state by the drive current output by a voltage driver 161.

A lens position detector 110 is an optical position detector which detects the position of the correcting lens 101 in the plane orthogonal to the optical axis I. The lens position detector 110 monitors the present position of the correcting lens 101, and feeds back the information concerning the present position of the correcting lens 101 to an image stabilizing controller 108 via an A/D converter.

The lens CPU 106 is a central processor that performs various controls of the lens barrel 102 side. The lens CPU 106 calculates the focal length based on the pulse signal output by a focal length detector 163, and calculates an object distance based on the pulse signal output by an object distance detector 164. Further, in the lens CPU 106, the image stabilizing lens correction calculator 107, the image stabilizing controller 108 and an autofocus lens controller 401 are provided. The lens CPU 106 can perform communication with a body CPU 109 via a lens junction 190 provided between the lens barrel 102 and the camera body 201. An image blur correction start command is sent from the body CPU 109 synchronously with half depression ON of a release switch 191 and an image blur correction stop command is sent to the CPU 106 synchronously with half depression OFF.

Further, the lens CPU 106 monitors the state of a blur correction switch (SW) 103 provided in the lens barrel 102. If the blur correction switch 103 is ON, the lens CPU 106 performs image blur correction control, and if the blur correction switch 103 is OFF, the lens CPU 106 ignores the image blur correction start command from the body CPU 109 and does not perform blur correction.

The image stabilizing lens correction calculator 107 is a part which converts the output signals of the filters 160a and 160c into the target velocity information for driving the lens barrel 102 to the target position. The image stabilizing controller 108, the filters 160a and 160c, an EEPROM 162, the focal length detector 163, and the object distance detector 164 are connected to the image stabilizing lens correction calculator 107. The autofocus lens controller 401 has an optical axis direction movement velocity calculator 402 which performs calculation for performing optical axis direction movement correction by using the accelerometer output value from the image stabilizing lens correction calculator 107, and outputs the calculation result to an autofocus lens voltage driver 172.

An autofocus lens 140 can be driven in the optical axis direction by an autofocus lens driver 141 using an ultrasonic motor or a stepping motor as a drive source. The autofocus lens voltage driver 172 generates a voltage for performing drive control of the autofocus lens driver 141.

The image stabilizing lens correction calculator 107 captures the output signals (analog signals) output from the angular velocity sensor 130 and the accelerometer 121 through the filters 160a and 160c by quantizing the signals by A/D conversion. Based on the focal length information obtained from the focal length detector 163, the object distance information obtained from the object distance detector 164 and the information peculiar to the lens which is written in the EEPROM 162, the image stabilizing lens correction calculator 107 converts the signals into the target drive velocity of the correcting lens 101. The conversion method (calculating method) to the target drive position performed by the image stabilizing lens correction calculator 107 will be described in detail later. The target velocity signal which is the information of the target drive velocity calculated by the image stabilizing lens correction calculator 107 is output to the image stabilizing controller 108.

The image stabilizing controller 108 is the part which controls the image stabilizing lens driver 120 via the voltage driver 161, and performs follow-up control so that the correcting lens 101 is driven as the information of the target drive velocity. The image stabilizing controller 108 converts the position detection signal (analog signal) output by the lens position detector 110 into a digital signal and captures the digital signal. The input part to the image stabilizing controller 108 is for the target velocity signal converted into the target drive velocity of the correcting lens 101 which is the output of the image stabilizing lens correction calculator 107, and another input part is for the positional information of the correcting lens 101 which is obtained by the lens position detector 110.

As the control in the image stabilizing controller 108, velocity control is performed by using the deviation between the target drive velocity of the correcting lens 101 and the actual velocity information. The image stabilizing controller 108 calculates a drive signal based on the target drive velocity, velocity information of the correcting lens 101 and the like, and outputs the digital drive signal to the voltage driver 161.

Alternatively, as the control in the image stabilizing controller 108, known PID control may be used. PID control is performed by using the deviation of the target positional information and the lens positional information of the correcting lens 101. The image stabilizing controller 108 calculates the drive signal based on the target positional information, the positional information of the correcting lens 101 and the like, and outputs the digital drive signal to the voltage driver 161.

The filters 160a and 160c are filters which remove predetermined frequency components from the output signals of the angular velocity sensor 130 and the accelerometer 121, and cut the noise component and the DC component included in the high-frequency band. The filters 160a and 160c perform A/D conversion of the angular velocity signals after the predetermined frequency components are removed, and thereafter, output the angular velocity signals to the image stabilizing lens correction calculator 107.

The voltage driver 161 is a driver which supplies power to the image stabilizing driver 120 according to the input drive signal (drive voltage). The voltage driver 161 performs switching for the drive signal, applies a voltage to the image stabilizing lens driver 120 to drive the image stabilizing lens driver 120.

The EEPROM 162 is a nonvolatile memory which stores lens data that is various kinds of unique information concerning the lens barrel 102, the coefficients for converting the pulse signals output by the object distance detector 164 into physical quantities.

The focal length detector 163 is a zoom encoder which detects a focal length. The focal length detector 163 outputs the pulse signal corresponding to a focal length value to the image stabilizing lens correction calculator 107. The object distance detector 164 is a focusing encoder for detecting the distance to an object. The object distance detector 164 detects the position of a shooting optical system 105 (autofocus lens 140), and outputs the pulse signal corresponding to the position to the image stabilizing lens correction calculator 107.

From the detection results of the focal length detector 163 and the object distance detector 164, the position of the principal point A of the shooting optical system 105 is calculated as will be described later. Alternatively, the positional information of the principal point A of the shooting optical system 105 stored in the EEPROM 162 is read, and control which will be described later is performed.

The body CPU 109 is a central processor which performs various controls of the entire camera system. The body CPU 109 transmits a blur correction start command to the lens CPU 106 based on the ON operation of the release switch 191. Alternatively, the body CPU 109 transmits a blur correction stop command to the lens CPU 106 based on the OFF operation of the release switch 191. Alternatively, various kinds of processing are performed other than them. Information on the release switch 191 is input to the body CPU 109, and the release switch 191 can detect half depressing or fully depressing operation of the release button not illustrated. The release switch 191 is a switch which detects the half depressing operation of the release button not illustrated, starts a series of shooting preparing operations, detects a fully depressing operation of the release button and starts a shooting operation.

Next, an interior of the image stabilizing correction calculator 107 will be described in detail.

A rotation angular velocity calculator 301 calculates a rotation angular velocity $\dot{\theta}_{caxy}$ based on the angular velocity sensor output value. The angular velocity sensor output value and the rotation angular velocity are generally in the linear relation, and therefore, the rotation angular velocity can be obtained by multiplying the angular velocity sensor output value by a coefficient.

A high-pass filter 303 is a filter which transmits a frequency component necessary for blur correction. A revolution angular velocity calculator 304 can obtain a revolution angular acceleration $\ddot{\theta}_{axy}$ by dividing a revolution acceleration component $jr_{axy}\ddot{\theta}_{axy}$ which is the input value from the high-pass filter 303 by an object side focal length $r_{axy}$. Further, by performing time integration of the revolution angular acceleration, a revolution angular velocity $\dot{\theta}_{axy}$ required for control is obtained.

A rotation revolution difference image stabilization amount calculator 305 calculates the image movement velocity in the $Y_2$ direction of the image pickup surface of the image pickup device 203 by substituting a read imaging magnification: β, an actual focal length value: f, and the rotation angular velocity $\dot{\theta}_{caxy}$ and the revolution angular velocity $\dot{\theta}_{axy}$, which are calculated in real time, into the following Expression (15) which will be described later.

$$\vec{V}_{dcxy(O_2-X_2Y_2)} \approx -(1+\beta)f(\dot{\theta}_{caxy}-\dot{\theta}_{axy})e^{j(\pi/2)} \quad (15)$$

The obtained image movement velocity becomes a target drive velocity. The image movement velocity in the $Z_2$ direction of the image pickup surface can be similarly obtained from expression (16) which will be described later, but the description will be omitted here.

A theoretical formula selector 306 selects whether the formula of rotation revolution difference movement correction using a difference between the rotation angular velocity and the revolution angular velocity, or the formula of rotation movement correction using only a rotation angular velocity as the formula used for correction calculation according to the ratio of the revolution angular velocity to the rotation angular velocity.

<<Meaning and Use Method of Rotation Revolution Blur Formula Expression (15)>>

In embodiment 1, the components of the camera shake (pitching angle movement and parallel movement in the $Y_2$ direction) in the XY plane are expressed by the rotation revolution movement formula, and the $Y_2$ direction image movement in the image pickup surface (image pickup surface vertical direction image movement) velocity is obtained by Expression (15) which is the approximate expression of the rotation revolution movement formula. In the description of the present invention, "vector R" is described as "$\vec{R}$".

$$\vec{V}_{dcxy(O_2-X_2Y_2)} \approx -(1+\beta)f(\dot{\theta}_{caxy}-\dot{\theta}_{axy})e^{j(\pi/2)} \quad (15)$$

where $\vec{V}_{dcxy(O_2-X_2Y_2)}$ represents an image movement velocity vector in an image pickup surface, β represents an imaging magnification [(without unit)] at the time of image blur correction of the shooting lens of this camera, f represents an actual focal length [mm] at the time of image blur correction of the shooting lens of this camera, $(1+\beta)f$ represents an image side focal length [mm], $\dot{\theta}_{caxy}$ represents time derivative value of the rotation angle $\theta_{caxy}$ with the principal point A as the center, rotation angular velocity [rad/sec], $\dot{\theta}_{axy}$ represents time derivative value of revolution angle $\theta_{axy}$ with an origin O as the center, and the revolution angular velocity [rad/sec], $e^{j(\pi/2)}$ represents that the image movement velocity vector indicates the direction rotated by 90 degrees from the $X_2$-axis (optical axis) in the polar coordinate system because of $(\pi/2)^{th}$ power.

The detailed deriving procedure of the approximate theoretical formula of the image movement velocity $\vec{V}_{dcxy(O_2-X_2Y_2)}$ in the moving coordinate system $O_2$-$X_2Y_2$ in the XY plane which is expression (15) will be described later, and here, the meaning of this formula will be described with reference to FIG. 2.

Figure 2:
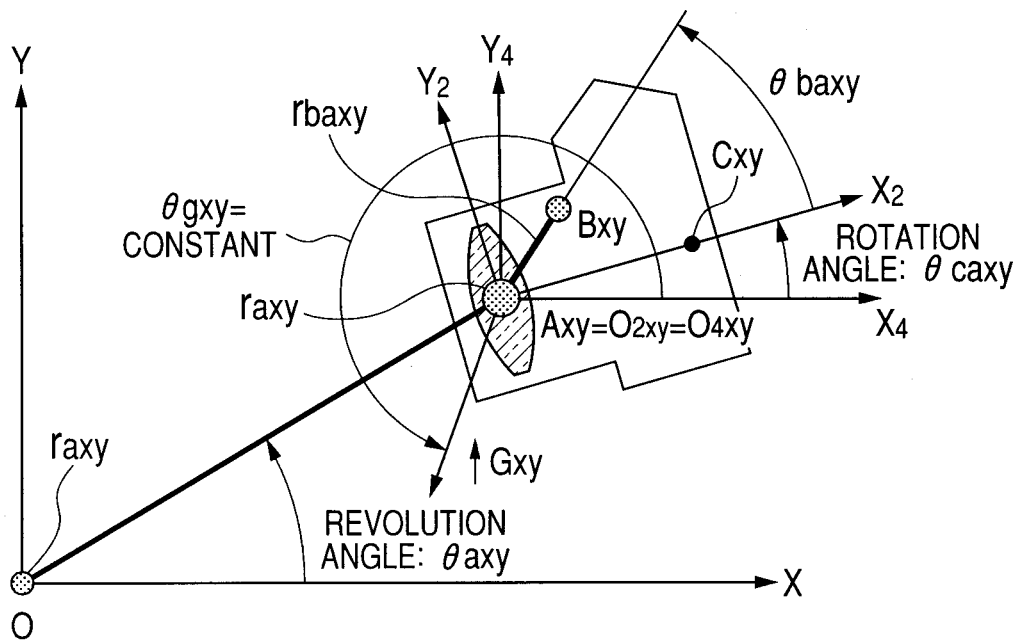
FIG. 2 is a simplified diagram of a camera state projected to an XY plane of embodiment 1.

FIG. 2 shows a schematic diagram of a state of a camera which is projected on an XY plane. Here, the outer shape and the lens of the camera are illustrated. In the camera, a principal point $A_{xy}$ of the optical system, an accelerometer $B_{xy}$, a center $C_{xy}$ of the image pickup device 203 are illustrated. An origin $O_4$ of the coordinate system $O_4$-$X_4Y_4$ is fixed to a principal point $A_{xy}$ of the optical system. When the principal point $A_{xy}$ is moved, an $X_4$-axis keeps a parallel state with respect to the X-axis, and a $Y_4$-axis keeps the parallel state with respect to a Y-axis. An origin $O_2$ of a coordinate system $O_2$-$X_2Y_2$ is fixed to the principal point $A_{xy}$, and moves integrally with the camera. In this case, the $X_2$-axis is always matched with the optical axis of this camera.

The angle around the origin $O_2$ from the $X_4$-axis to the $X_2$-axis is set as the rotation angle $\theta_{caxy}$. The angle around the origin O from the X-axis to a scalar $r_{axy}$ is set as a revolution angle $\theta_{axy}$. Scalar $r_{axy} \approx (1+\beta)f/\beta$ represents an object side focal length. β is an imaging magnification. A gravity acceleration vector $\vec{G}_{xy}$ at the principal point $A_{xy}$ has an angle $\theta_{gxy}$ around the principal point $A_{xy}$ from the $X_4$-axis to the vector $\vec{G}_{xy}$ by normal rotation (counterclockwise). The $\theta_{gxy}$ is a constant value.

The approximate expression means that the image movement velocity in the $Y_2$ direction in the image pickup surface can be expressed by −(image side focal length)×(value obtained by subtracting the revolution angular velocity from the rotation angular velocity). The exact formula without approximation is expression (12). When image blur correction with higher precision is performed, the exact formula expression (12) may be used. Here, $r_{axy} \approx (1+\beta)f/\beta$ represents the object side focal length.

$$\vec{V}_{dcxy(O_2-X_2Y_2)} = \left[\frac{f\dot{r}_{axy}}{r_{axy}-f} - \frac{fr_{axy}\dot{r}_{axy}}{(r_{axy}-f)^2}\right]e^{j(\theta_{axy}-\theta_{caxy})} + \quad (12)$$

$$\frac{fr_{axy}}{r_{axy}-f}\dot{\theta}_{axy}e^{j(\theta_{axy}+\pi/2-\theta_{caxy})} - (1+\beta)f\dot{\theta}_{caxy}e^{j(\pi/2)}$$

Similarly to the case of the XY plane, the components of the yawing angle movement of the camera shake on the ZX plane and the parallel movement in the $Z_2$-direction are expressed by the rotation revolution movement formula, and the $Z_2$ direction image movement (image movement in the lateral direction of the image pickup surface) velocity in the image pickup device surface is obtained by the approximate expression (16). This means the same thing as expression (15), and therefore, the description will be omitted here.

Next, the component included in the output of the accelerometer 121 will be described. The deriving procedure of the formula will be described later. Here, the necessary items for image stabilization will be described. The accelerometer output $A_{ccy2(O-X2Y2)}$ in the $Y_2$-axis direction, which is used for obtaining the revolution angular velocity $\dot{\theta}_{axy}$ is represented by expression (27).

$$A_{ccy2(O-X_2Y_2)} \approx jr_{axy}\ddot{\theta}_{axy}$$

(third term: acceleration of revolution)

$$+j2\dot{r}_{axy}\dot{\theta}_{axy}$$

(forth term: Coriolis force)

$$+jr_{baxy}\dot{\theta}_{caxy}{}^2 \sin(\theta_{baxy}+\pi)$$

(fifth term: centripetal force of rotation)

$$+jr_{baxy}\ddot{\theta}_{caxy} \sin(\theta_{baxy}+\pi/2)$$

(sixth term: acceleration of rotation)

$$+jG \sin(\theta_{gxy}-\pi)$$

(seventh term: gravity acceleration component)   (27)

The third term $jr_{axy}\ddot{\theta}_{axy}$ in expression (27) is the component required for obtaining the revolution angular velocity $\dot{\theta}_{axy}$ which is desired to be obtained in embodiment 1, and if the third term is divided by the known $r_{axy}$, and is integrated, the revolution angular velocity $\dot{\theta}_{axy}$ is obtained. The fourth term, the fifth term, the sixth term and the seventh term are unrequired terms for calculation, and unless they are erased, they become the error components at the time of obtaining the revolution angular velocity $\dot{\theta}_{axy}$. The fourth term $j2\dot{r}_{axy}\dot{\theta}_{axy}$ represents Coriolis force, and if the movement in the camera optical axis direction is small, the velocity in the optical axis direction $\dot{r}_{axy} \approx 0$, the fourth term is the term which can be ignored. Expression (27) will be also described later.

The fifth term and the sixth term are error components which are included in the accelerometer output $A_{ccy2(O-x2y2)}$ since the accelerometer 121 cannot be disposed in the ideal principal point position A, and is disposed in the position B. The fifth term $jr_{baxy}\dot{\theta}_{caxy}{}^2 \sin(\theta_{baxy}+\pi)$ is the centripetal force which is generated due to the rotation of the accelerometer 121 around the principal point A. $r_{baxy}$ and $\theta_{baxy}$ represent the coordinates of the position B where the accelerometer 121 is mounted, and are known. $\dot{\theta}_{caxy}$ is a rotation angular velocity, and is the value which can be measured by the angular velocity sensor 130 mounted to the camera. Therefore, the value of the fifth term can be calculated.

The sixth term $jr_{baxy}\ddot{\theta}_{caxy} \sin(\theta_{baxy}+\pi/2)$ is the acceleration component when the accelerometer 121 rotates around the principal point A, and $r_{baxy}$ and $\theta_{baxy}$ represent the coordinates of the position B where the accelerometer 121 is mounted, and are known. $\ddot{\theta}_{caxy}$ can be calculated by differentiating the value of the angular velocity sensor 130 mounted to the camera. Therefore, the value of the sixth term can be calculated.

The seventh term $jG \sin(\theta_{gxy}-\pi)$ is the influence of the gravity acceleration, and can be treated as the constant in this approximate expression, and therefore, can be eliminated by the filtering processing of a circuit.

The accelerometer output $A_{ccx2(O-X2Y2)}$ in the $X_2$-axis direction that is an optical axis for use in optical axis direction movement correction is represented by expression (26).

$$A_{ccx2(O-X_2Y_2)} \approx \ddot{r}_{axy}$$

(first term: optical axis direction movement)

$$-r_{axy}\dot{\theta}_{axy}{}^2$$

(second term: centripetal force of revolution)

$$+r_{baxy}\dot{\theta}_{caxy}{}^2 \cos(\theta_{baxy}+\pi)$$

(fifth term: centripetal force of rotation)

$$+r_{baxy}\ddot{\theta}_{caxy} \cos(\theta_{baxy}+\pi/2)$$

(sixth term: acceleration of rotation)

$$+G \cos(\theta_{gxy}-\pi)$$

(seventh term: gravity acceleration component)   (26)

In expression (26), what is required for optical axis direction movement correction is only the first term $\ddot{r}_{axy}$ (acceleration in the optical axis direction). The second term, the fifth term, the sixth term and the seventh term are the components unrequired for the optical axis direction movement correction, and unless they are erased, they become error components at the time of obtaining the acceleration $\ddot{r}_{axy}$ in the $X_2$-axis direction which is the optical axis. The second term, the fifth term, the sixth term and the seventh term can be deleted by the similar method to the case of expression (27). Expression (26) will also be described later.

As described above, the error components included in the output of the accelerometer 121 can be erased, but if the correction calculation is performed, blur correction operation start is delayed by the calculation time, and accurate blur correction cannot be made.

Thus, based on the following concept, the accelerometer 121 is placed in the lens barrel 102, and thereby, the error component included in the output of the accelerometer 121 can be minimized. Therefore, the correction calculating time is not required, and thereby, accurate blur correction can be made.

Figure 3:
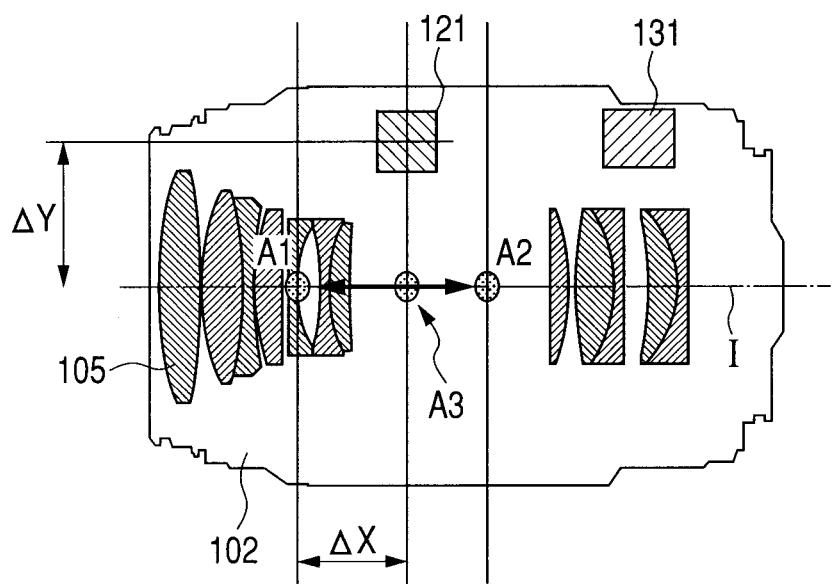
FIG. 3 is a diagram illustrating a principal point position and a position of an accelerometer in embodiment 1.

FIG. 3 is a sectional view of the lens barrel 102, and is for describing the arrangement of the shooting optical system 105, the accelerometer 121 and the angular velocity sensor 131. In FIG. 3, the principal point of the shooting optical system 105 is located on the optical axis I, and according to the imaging magnification set by the user, the principal point of the shooting optical system moves on the optical axis I within the range from the principal point position A1 at the time of equal-magnification shooting (as the time of proximity shooting) to the principal point position A2 at the time of infinite shooting ($\beta=0.0$). More specifically, the principal point moves on the optical axis I within the range of the point (first point) at which the shooting magnification $\beta$ becomes 1.0 and the second point which is the principal point position at which the shooting magnification $\beta$ becomes 0.0 in the shooting optical system. The angular velocity sensor 131 is placed at an arbitrary position of the lens barrel 102, but the accelerometer 121 is placed at the position in the optical axis I direction between the principal point position A1 (first point) at the time of equal-magnification shooting and the principal point position A2 (second point) at the time of infinity shooting. For example, the accelerometer 121 is placed at the position in the optical axis direction, where the shooting magnification $\beta$ becomes 0.5.

The position in the optical axis I direction of the accelerometer 121 is set as a principal point position A3, the distance in the optical axis I direction from the principal point position A1 at the time of equal-magnification shooting is set as $\Delta X$, and the distance in the direction perpendicular to the optical axis I is set as $\Delta Y$. Thereby, in expression (27), in the case of equal-magnification shooting, $r_{baxy}=\Delta Y/\sin\theta_{baxy}$ is satisfied. Namely, $\tan\theta_{baxy}=\Delta Y/\Delta X$ is satisfied.

Here, the sum of the fifth term and the sixth term which are the unrequired terms in expression (27) is expressed as an accelerometer position error function $g(\theta_{ba})$ as follows.

$$g(\theta_{ba}) = jr_{baxy}\dot{\theta}_{baxy}^2 \sin(\theta_{baxy}+\pi) + jr_{baxy}\ddot{\theta}_{caxy} \sin(\theta_{baxy}+\pi/2) \qquad (30)$$

As described above, the fourth term in expression (27) can be ignored, and the seventh term also can be eliminated by filtering processing of a circuit. Therefore, the outputs of the accelerometer 121 after the filtering processing are the third term, the fifth term and the sixth term, and therefore, when the ratio of the accelerometer position error function $g(\theta_{ba})$ included in the output of the accelerometer 121 and represented by expression (30) is set as an error ratio function $f(\theta_{ba})$, the error ratio function $f(\theta_{ba})$ can be expressed as follows.

$$f(\theta_{ba}) = \frac{r_{baxy}\dot{\theta}_{caxy}^2 \sin(\theta_{baxy}+\pi) + r_{baxy}\ddot{\theta}\sin(\theta_{baxy}+\pi/2)}{r_{axy}\ddot{\theta}_{axy} + r_{baxy}\dot{\theta}_{caxy}^2\sin(\theta_{baxy}+\pi) + r_{baxy}\ddot{\theta}_{caxy}\sin(\theta_{baxy}+\pi/2)} \qquad (31)$$

Hereinafter, the accelerometer 121 is assumed to be disposed at the position with the shooting magnification of $\beta=0.5$. In what is expressed in expression (31), $r_{axy}$ represents the function of the shooting magnification $\beta$, and as a result of the earnest study of the present applicant, it is known that $\ddot{\theta}_{axy}$ is in the linear relation with the imaging magnification $\beta$. Therefore, expression (31) can be expressed as follows.

$$f(\theta_{ba}) = \frac{r_{baxy}\dot{\theta}_{caxy}^2 \sin(\theta_{baxy}+\pi) + r_{baxy}\ddot{\theta}\sin(\theta_{baxy}+\pi/2)}{r_{axy(\beta=0.5)} \times \frac{(1+\beta)f}{\beta \times f_{(\beta=0.5)}} \times \dot{\theta}_{caxy(\beta=0.5)}^2 \times \frac{(1+0.5)f_{(\beta=0.5)}}{\frac{0.5}{(1+\beta)f}}} + \qquad (32)$$
$$r_{baxy}\dot{\theta}_{caxy}^2\sin(\theta_{baxy}+\pi) + r_{baxy}\ddot{\theta}_{caxy}\sin(\theta_{baxy}+\pi/2)$$

Incidentally, it is known that even if the shooting posture and the imaging magnification change, $\dot{\theta}_{caxy}$ and $\ddot{\theta}_{caxy}$ are substantially constant as a result of the study of the present applicant. Therefore, the error ratio function $f(\theta_{ba})$ shown in expression (32) is as follows when the values of $\dot{\theta}_{caxy}$ and $\ddot{\theta}_{caxy}$ are substituted.

$$f(\theta_{ba}) = \frac{-0.433 \times 10^{-6} \times \tan\theta_{ba} + 0.342}{0.0497 \times \tan\theta_{ba} \times \frac{(1+\beta)f}{\beta \times f_{(\beta=0.5)}} \times \frac{(1+0.5)f_{(\beta=0.5)}}{\frac{0.5}{(1+\beta)f}} + 0.342} \qquad (33)$$

Figure 4A:
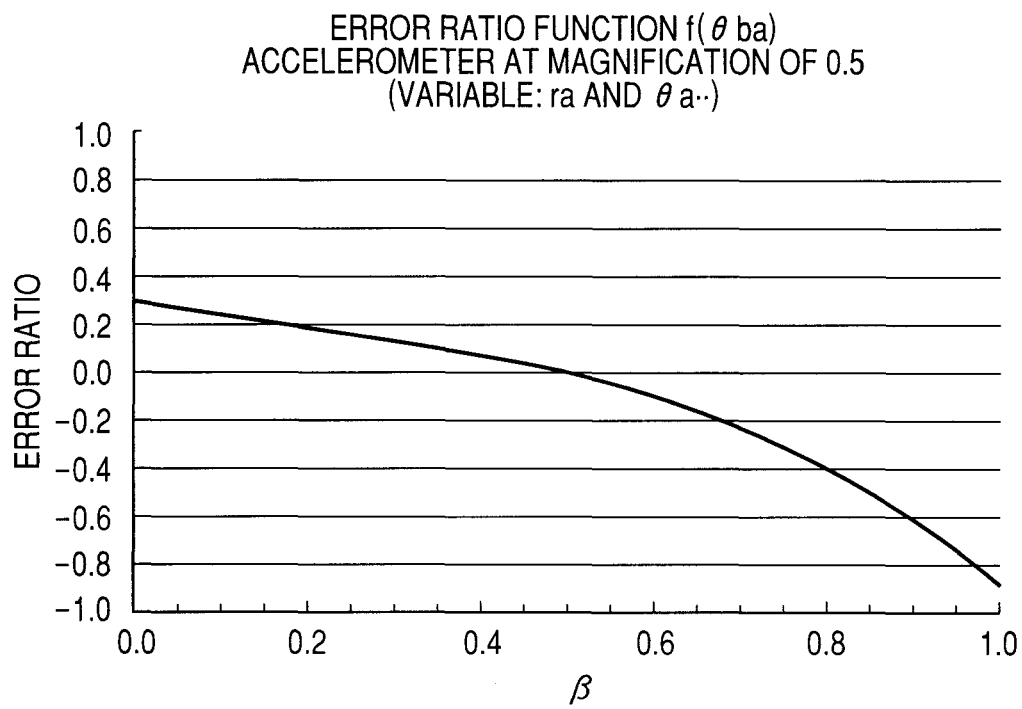
FIGS. 4A and 4B are diagrams illustrating error ratio functions of accelerometer outputs in the state of FIG. 3.

FIG. 4A illustrates the error ratio in each imaging magnification which is obtained by obtaining the focal length f of the shooting optical system 105 and the imaging magnification at the time, in Expression (33). FIG. 4A illustrates the error at the time of disposing the accelerometer 121 at the imaging magnification $\beta=0.5$ as described above.

Figure 4B:
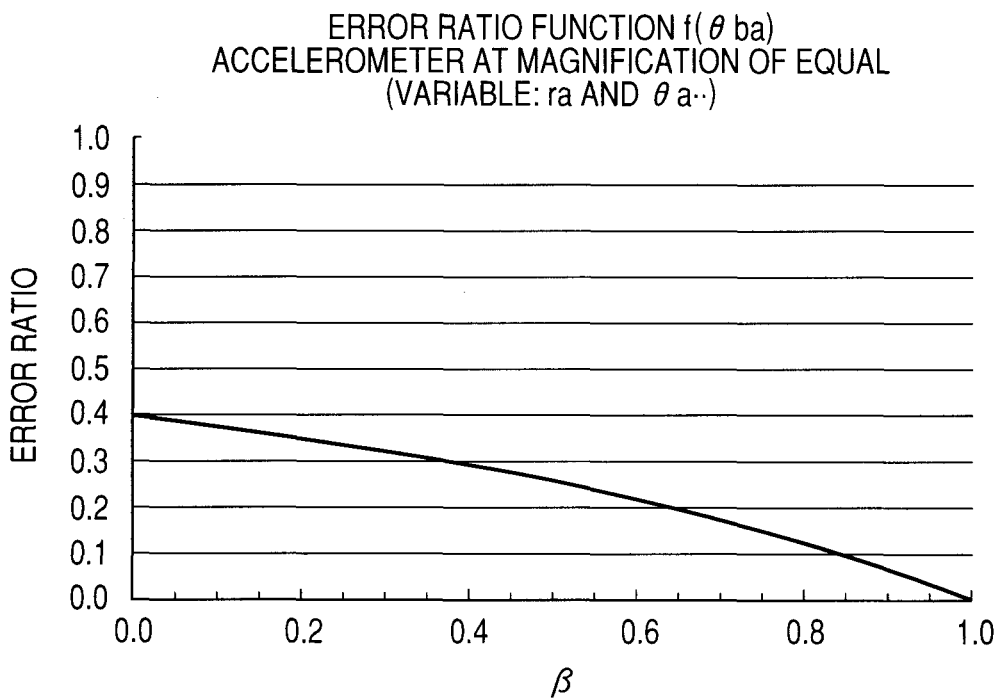
Figure 5:
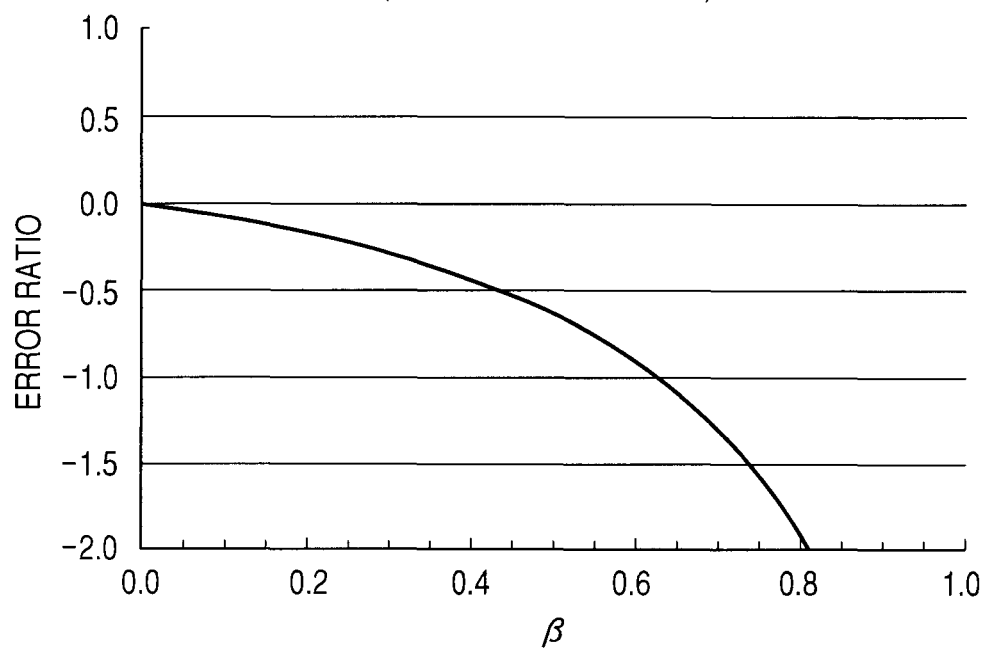
FIG. 5 is a diagram illustrating an error ratio function of an accelerometer output at an infinite position.
Figure 6:
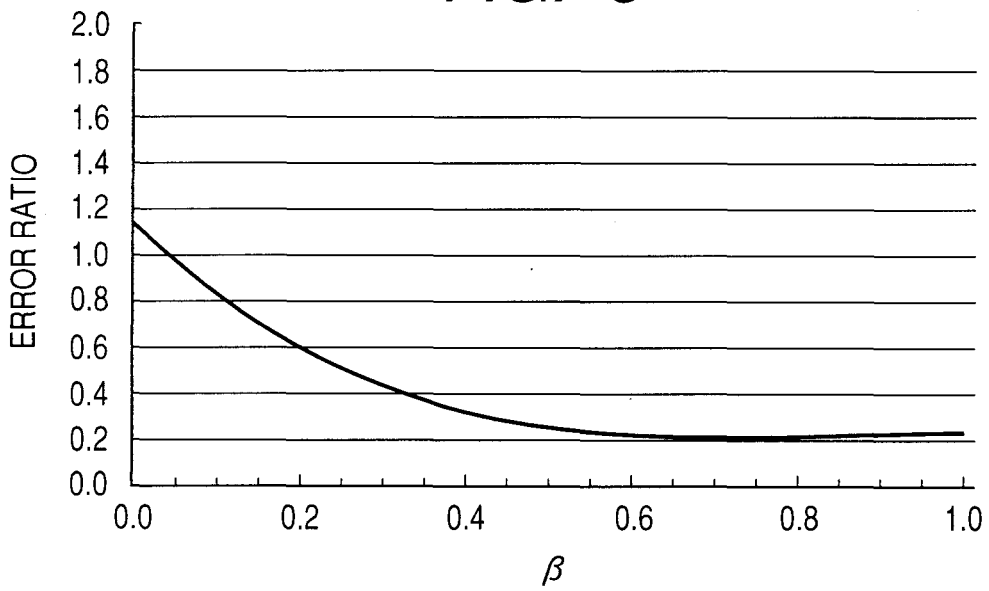
FIG. 6 is a diagram illustrating a position in which an error ratio of the accelerometer output in the state of FIG. 3 becomes the minimum.

Subsequently, the error ratio at each time when the accelerometer 121 is disposed at the principal point position A1 at the time of the equal-magnification shooting of the shooting optical system 105 to the principal point position A2 at the time of infinity shooting. FIG. 4B and FIG. 5 illustrate the error ratios at the time of disposing the accelerometer 121 at the equal-magnification position and the infinity position, for example. FIG. 6 illustrates how the result of sum of products of the values at the respective imaging magnifications of the error ratios obtained as illustrated in FIGS. 4A, 4B and 5 changes when the accelerometer 121 is disposed at the respective shooting magnifications. As illustrated in FIG. 6, it is found out that when the accelerometer 121 is disposed in the vicinity of the position of the imaging magnification $\beta=0.7$, the error ratio becomes the smallest as compared with the case where the accelerometer 121 is disposed at the other shooting magnifications. Therefore, the error component included in the output of the accelerometer 121 can be minimized by disposing the accelerometer 121 in the vicinity of the position of the imaging magnification $\beta=0.7$ of the shooting optical system 105, and therefore, correction calculating time of the output of the accelerometer 121 becomes unnecessary.

<<Description of Flowchart>>

Figure 7B:
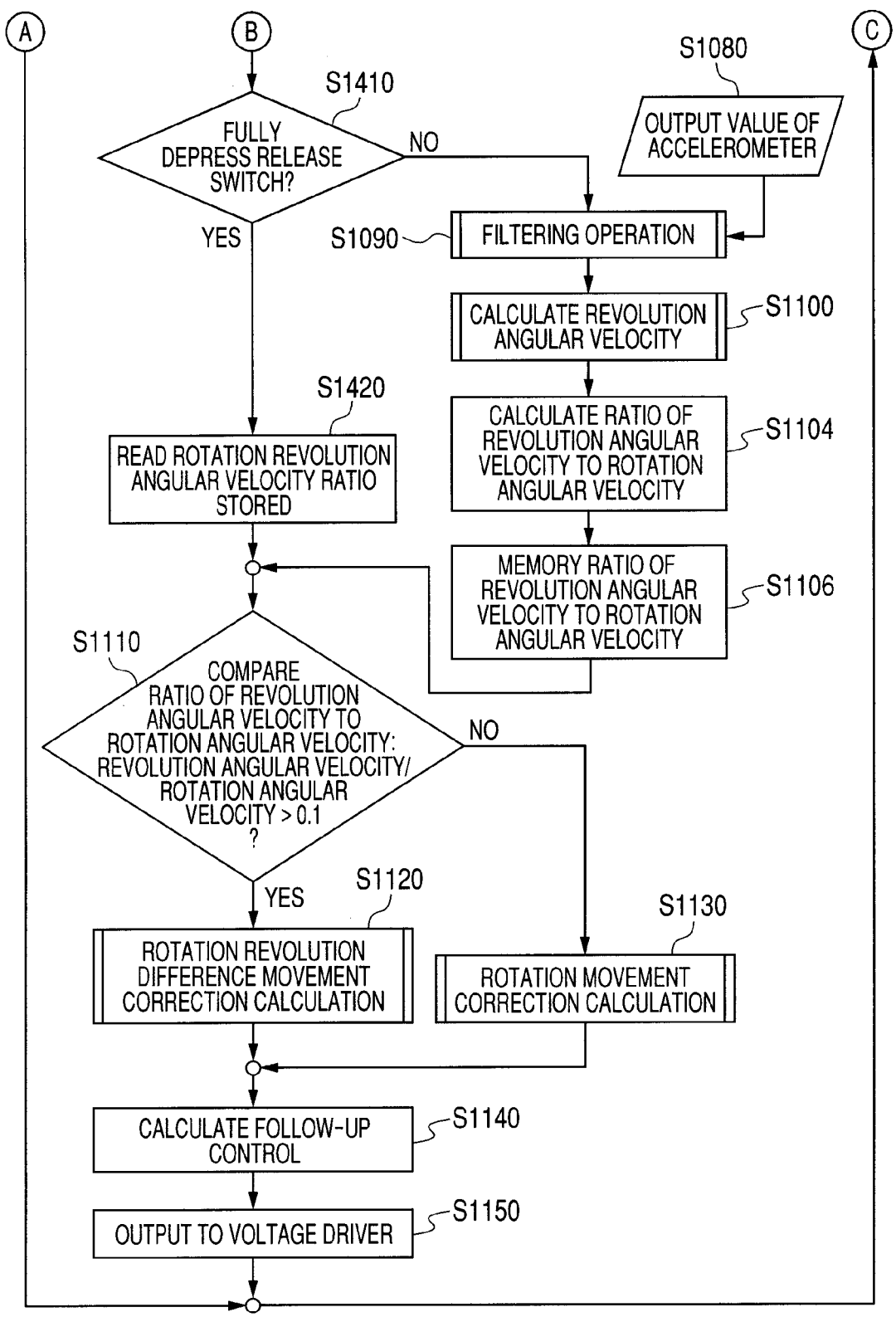
FIG. 7 which is composed of FIGS. 7A and 7B are flowcharts illustrating an operation of embodiment 1.

FIGS. 7A and 7B are flowcharts illustrating the flow of the operation relating to the image stabilizing lens correction of the image stabilization apparatus in embodiment 1. Hereinafter, the operation relating to the correction amount calculation of the correcting lens 101 will be described according to FIGS. 7A and 7B.

In step (hereinafter, described as S) 1010, when the blur correction SW 103 is in an ON state, a correction start command is output from the camera body 201 by half depression ON of the release switch 191. By receiving the correction start command, the blur correction operation is started.

In S1020, it is determined whether or not a blur correction stop command is output from the camera body 201, and when it is output, the flow proceeds to S1400, and the blur correcting operation is stopped. When it is not output, the flow proceeds to S1030 to continue the blur correction operation. Accordingly, the blur correction operation is continued until a blur correction stop command is output from the camera body 201.

In S1030, the numeric value obtained from the focal length detector 163 is read. The numeric value of the focal length detector 163 is used for calculation of the imaging magnification $\beta$. In S1040, the numeric value (absolute distance) obtained from the object distance detector 164 is read. In S1050, the imaging magnification $\beta$ is calculated based on the numeric value of the focal length detector 163 and the numeric value of the object distance detector 164. Calculation of the imaging magnification $\beta$ is a unique formula depending on the optical system configuration, and is calculated based on the imaging magnification calculation formula. The obtaining of the imaging magnification $\beta$ does not especially have to be performed based on the formula, but the imaging magnification may be obtained from a table with respect to the encoder position of the focal length and the absolute distance.

In S1060, the outputs of the angular velocity sensor 130 and the accelerometer 121 are read. In S1070, the rotation angular velocity $\dot{\theta}_{caxy}$ is calculated based on the angular velocity sensor output value from S1310. The angular velocity sensor output value and the rotation angular velocity are generally in the linear relation, and therefore, the rotation angular velocity can be obtained by multiplication by a coefficient.

In S1410, it is determined whether the release switch 191 is fully depressed to be ON, that is, whether the release button not illustrated is fully depressed. If YES, that is, if it is the exposure time of the camera, the flow proceeds to S1420, and if NO, that is, if it is before exposure, the flow proceeds to S1090. In S1090, filtering processing is performed for the accelerometer output value $A_{ccy2(O-X2Y2)}$ from S1080, and the seventh term of expression (27) is erased. The value after the elimination is set as $A'_{ccy2(O-X2Y2)}$.

In S1100, the output value of S1090: $A'_{ccy2(O-X2Y2)}$ is divided by the object side focal length $r_{axy}$, and thereby, the revolution angular acceleration $\ddot{\theta}_{axy}$ is obtained. Further, by performing time integration of the revolution angular acceleration, the revolution angular velocity $\dot{\theta}_{axy}$ necessary for control is obtained. In the next S1104, the ratio of the revolution angular velocity to the rotation angular velocity obtained in S1070 is calculated. In the next S1106, the value of the rotation revolution angular velocity ratio calculated in S1104 is stored. When the previous value remains, the new one is written over the previous value and is stored, and the flow proceeds to S1110.

In S1420, the value of the rotation revolution angular velocity ratio stored in S1106 in the past is read, and the flow proceeds to S1110. In S1110, it is determined whether or not the ratio of the rotation angular velocity $\dot{\theta}_{caxy}$ from S1070 and the revolution angular velocity $\dot{\theta}_{axy}$ from S1100 is larger than 0.1 (larger than the predetermined value). When the ratio is larger than 0.1, the flow proceeds to S1120. When the ratio is 0.1 or less (the predetermined value or less), the flow proceeds to S1130.

In the rotation revolution difference movement correction calculation of S1120, the image movement velocity in $Y_2$ direction of the image pickup surface is calculated by substituting the read imaging magnification β, the actual focal length value f, the rotation angular velocity value $\dot{\theta}_{caxy}$ calculated in real time, and the estimated revolution angular velocity $\dot{\theta}_{axy}$ obtained by multiplying the rotation revolution angular velocity ratio stored in S1106 by the rotation angular velocity value $\dot{\theta}_{caxy}$ calculated in real time into expression (15).

$$\vec{V}_{dcxy(O_2-X_2Y_2)} \approx -(1+\beta)f(\dot{\theta}_{caxy}-\dot{\theta}_{axy})e^{j(\pi/2)} \quad (15)$$

The obtained image movement velocity becomes the correction target velocity. The image movement velocity in the $Z_2$-direction of the image pickup surface is similarly obtained from expression (16), but the description is omitted here.

In rotation movement correction calculation of S1130, the revolution angular velocity $\dot{\theta}_{axy}$ which is substituted into expression (15) is set as a constant zero without performing calculation from the sensor output. Therefore, expression (15) is simplified, and is written as follows.

$$\vec{V}_{dcxy(O_2-X_2Y_2)} \approx -(1+\beta)f\dot{\theta}_{caxy}e^{j(\pi/2)}$$

If the rotation angular velocity $\dot{\theta}_{caxy}$ from S1070 in real time is substituted into expression (15), the image movement velocity in the $Y_2$-direction in real time is obtained.

In S1140, follow-up control calculation for driving the correcting lens 101 is performed, with considering the sensitivity of the correcting lens 101, based on the image movement velocity obtained by the rotation revolution difference movement correction calculation (S1120) or the rotation movement correction calculation (S1130). At this time, the present position output of the correcting lens 101 is simultaneously monitored.

In S1150, the calculation result is output to the voltage driver 161 which drives the correcting lens 101 based on the follow-up control calculation result in S1140. After the calculation result is output to the voltage driver 161, the flow returns to S1020.

In S1300, it is determined whether or not the imaging magnification β is 0.15 or more. When the imaging magnification β is 0.15 or more, the flow proceeds to S1320. When the imaging magnification β is less than 0.15 in S1300, the flow proceeds to S1410.

In S1320, by performing filtering processing for the angular velocity sensor output value $A_{ccx2(O-X2Y2)}$ in the $X_2$-axis (optical axis) direction from S1310, the unrequired seventh term of expression (26) is erased, and by time integration of the value, the optical axis direction movement velocity $\dot{r}_{axy}$ obtained.

In S1330, based on the optical axis direction blur velocity $\dot{r}_{axy}$ from S1320, follow-up control calculation for driving the autofocus lens 140 is performed. In S1340, based on the follow-up control calculation result in S1330, the calculation result is output to the autofocus lens voltage driver 172 which drives the autofocus lens 140, and thereafter, the flow returns to S1020.

<<Detailed Description of Rotation Revolution Model Diagram and Rotation Revolution Movement Formula>>

Hereinafter, description of a rotation revolution model diagram and description of a rotation revolution movement formula will be performed. First, the coordinate system of the image stabilization apparatus will be described.

First, a moving coordinate system $O_2$-$X_2Y_2Z_2$ which is fixed to the camera will be described. At the time of camera being shaken, the coordinate system $O_2$-$X_2Y_2Z_2$ performs shake movement integrally with the camera, and therefore, the coordinate system is called a moving coordinate system.

Figure 8A:
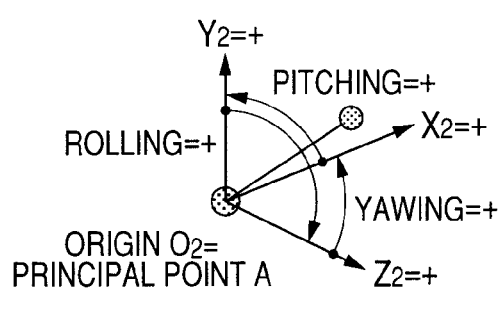
FIG. 8A is a diagram illustrating a coordinate system fixed onto a camera.

A three-dimensional coordinate system will be described with a three-dimensional coordinate system diagram of FIG. 8A. The coordinate system is an orthogonal coordinate system, and as in FIG. 8A, the $X_2$-axis, $Y_2$-axis and $Z_2$-axis are orthogonal to one another. Pitching is defined as the rotation about the $Z_2$-axis around the origin $O_2$ and the pitching from the +$X_2$-axis to the +$Y_2$-axis is assigned with plus sign with the origin $O_2$ as the center. Yawing is defined as the rotation about the $Y_2$-axis around the origin $O_2$ and the yawing from the +$Z_2$-axis to the +$X_2$-axis is assigned with plus sign. Rolling is defined as the rotation about the $X_2$-axis around the origin $O_2$ and the rolling from the +$Y_2$-axis to the +$Z_2$-axis is assigned with plus sign.

Figure 8B:
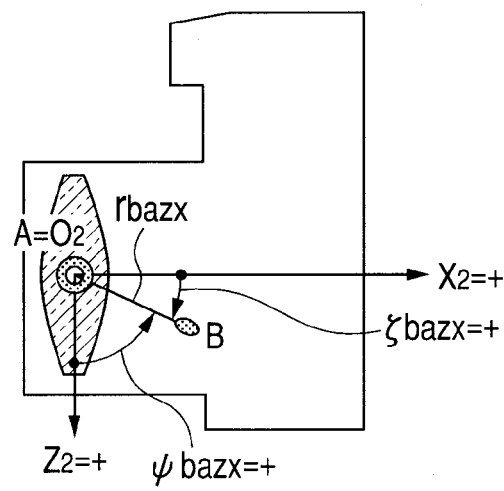
FIG. 8B is a diagram illustrating a top view of the camera.
Figure 8C:
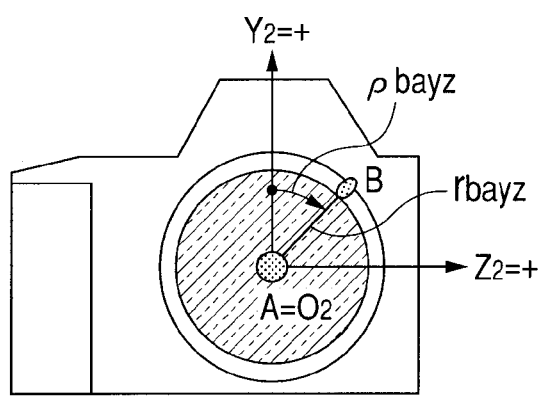
FIG. 8C is a diagram illustrating a front view of the camera.
Figure 8D:
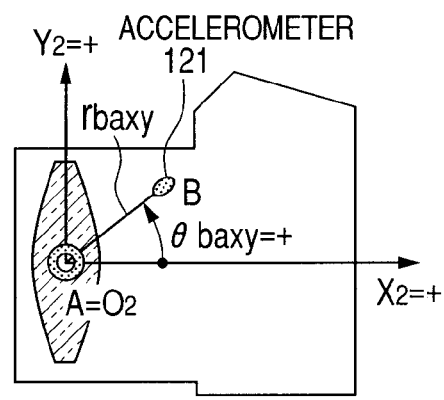
FIG. 8D is a diagram illustrating a side view of the camera.

FIG. 8D is a camera side view with the camera sectional view of FIG. 1 being simplified, and the lens is illustrated in the see-through state. With the camera side view of FIG. 8D, the coordinate system $O_2$-$X_2Y_2Z_2$ which is fixed to the camera will be described.

The origin $O_2$ of the coordinate system is fixed to the principal point A of the entire optical system (shooting optical system 105) which exists in the lens barrel 102, and the image pickup device direction on the optical axis is set as the plus direction of $X_2$-axis. The camera upper direction (upper direction of this drawing) is set as the plus direction of $Y_2$-axis, and the remaining direction is set as the plus $Z_2$ axis. In the state in which the camera is projected on an $X_2Y_2$ plane, a position B of the accelerometer 121 is expressed by a line segment length $r_{baxy}$ between the origin $O_2$ and the position B of the accelerometer 121, and an angle $\theta_{baxy}$ formed by the $X_2$-axis and the line segment $r_{baxy}$. The rotational direction in the direction to the plus $Y_2$-axis from the plus $X_2$-axis with the $O_2$-axis as the center is set as plus direction.

The camera top view of FIG. 8B, illustrates the position B of the accelerometer 121 in the state projected onto a $Z_2X_2$ plane. In the state in which the camera is projected onto the $Z_2X_2$ plane, the position B of the accelerometer 121 is expressed by a line segment $r_{bazx}$ between the origin $O_2$ and the position B of the accelerometer 121 and an angle $\psi_{bazx}$ formed by the $Z_2$-axis and the line segment $r_{bazx}$. The rotational direction in the direction to +$X_2$-axis from the +$Z_2$-axis is set as plus direction. Further, the position B is also expressed by an angle $\zeta_{bazx}$ formed by the $X_2$-axis and the line segment $r_{bazx}$. The rotational direction in the direction to the $+Z_2$-axis from the $+X_2$-axis is set as plus direction.

The camera front view of FIG. 8C illustrates the position of the accelerometer 121 in the state projected on a $Y_2Z_2$ plane. In the state projected on the $Y_2Z_2$ plane, the position B of the accelerometer 121 is expressed by a line segment length $r_{bayz}$ between the origin $O_2$ and the position B of the accelerometer 121, and an angle $\rho_{bayz}$ formed between the $Y_2$-axis and the line segment $r_{bayz}$. The rotational direction in the direction of the $+Z_2$-axis from the $+Y_2$-axis with the $O_2$-axis as the center is set as plus direction.

Next, a fixed coordinate system $O_9$-$X_9Y_9Z_9$ where an object S is present will be described. The coordinate system $O_9$-$X_9Y_9Z_9$ is integral with the object, and therefore, will be called a fixed coordinate system.

Figure 9:
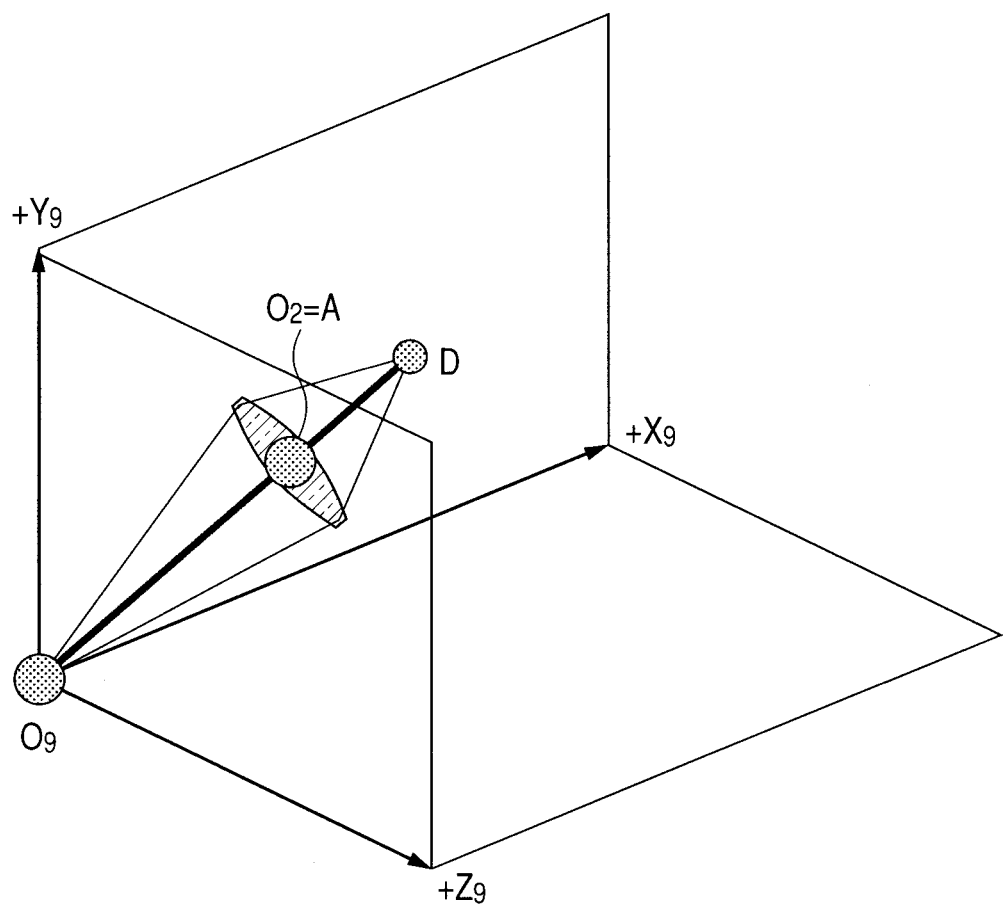
FIG. 9 is a view expressing only an optical system of the camera in a three-dimensional space.

FIG. 9 is a diagram expressing only the optical system of the camera in a three-dimensional space. A point A=$O_2$ is the principal point A of the shooting optical system 105 already described, and is also an origin $O_4$ of the coordinate system $O_4$-$X_4Y_4Z_4$.

The disposition of the initial state (time t=0) of the fixed coordinate system $O_9$-$X_9Y_9Z_9$ will be described. A coordinate origin $O_9$ is matched with the subject to be shot. A coordinate axis $+Y_9$ is set in the direction opposite to the gravity acceleration direction of the earth. Remaining coordinate axes $+X_9$ and $+Z_9$ are arbitrarily disposed. A point D is an imaging point of the object S, and is geometric-optically present on the extension of a line segment OA.

Figure 10A:
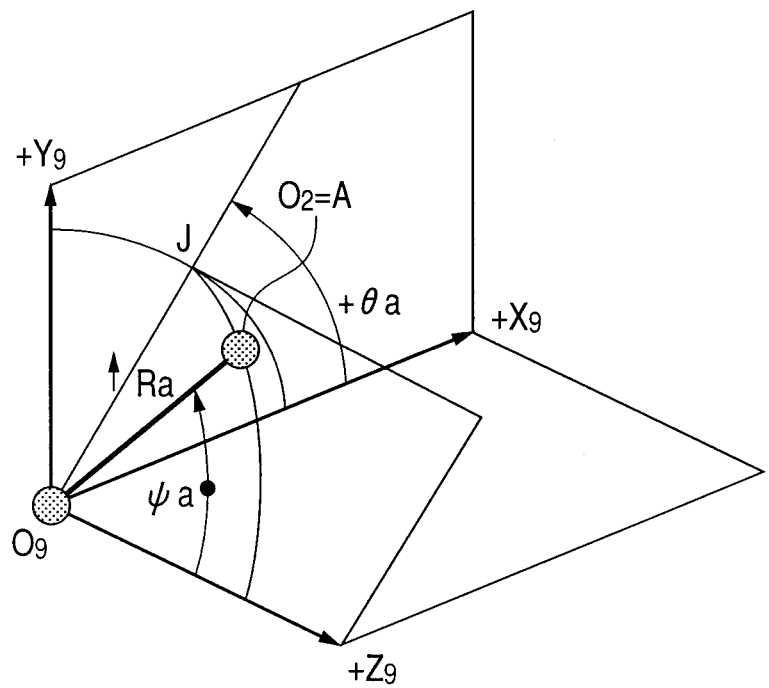
FIGS. 10A and 10B are views illustrating a polar coordinate system and an orthogonal coordinate system of a principal point A.

With FIG. 10A, a three-dimensional expression method of the principal point A in the fixed coordinate system $O_9$-$X_9Y_9Z_9$ will be described. Since the position of the camera is illustrated on the space, only the principal point A to be the reference is illustrated in FIG. 10A, and the other portions such as the imaging point D and the like are not illustrated. The principal point A is shown by the vector with the origin $O_9$ as the reference, and is set as $\vec{R}_a$. The length of the $\vec{R}_a$ is set as a scalar $r_a$. An angle to the $\vec{R}_a$ from the $Z_9$-axis with $O_9$ as the center is set as $\psi_a$. An angle from the $X_9$-axis from a straight line OJ, which is the line of intersection between a plane including the $\vec{R}_a$ and the $Z_9$-axis and the XY plane, is set as $\theta_a$.

As described above, $\vec{R}_a$ can be expressed in the polar coordinate system by three values of the scalar $r_a$, the angle $\psi_a$, and the angle $\theta_a$. If the three values can be calculated from measurement by a sensor and the like, the position of the principal point A of the camera is obtained.

<<Reference: Orthogonal Coordinate System Transformation Formula>>

In this case, the formula for transforming the position of the principal point A into an orthogonal coordinate system from a polar coordinate system is the following formula.

Figure 10B:
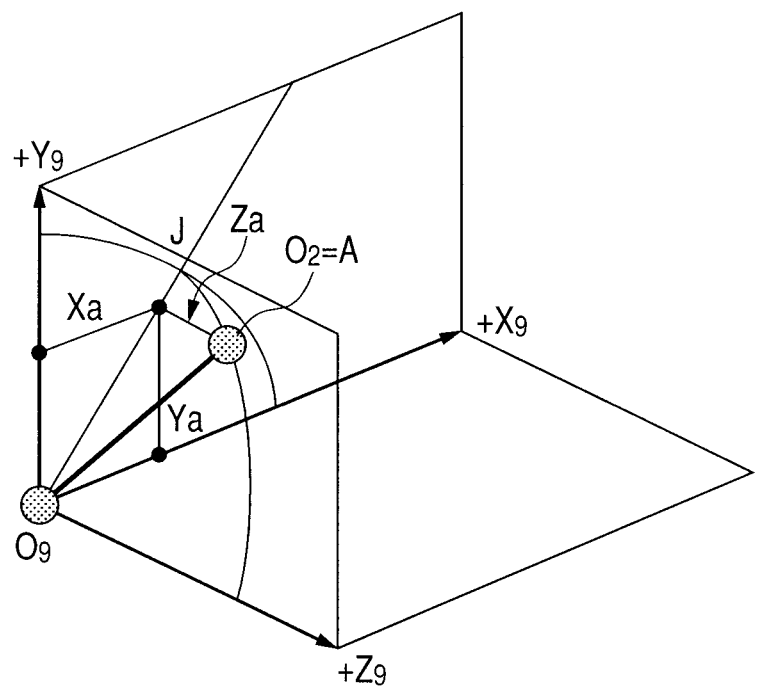

In FIG. 10B, the orthogonal coordinate system is illustrated.

$X_a = r_a \sin \psi_a \times \cos \theta_a$ $Y_a = r_a \sin \omega_a \times \sin \theta_a$ $Z_a = r_a \cos \psi_a$ (Description of Projection Coordinate System)

Figure 11:
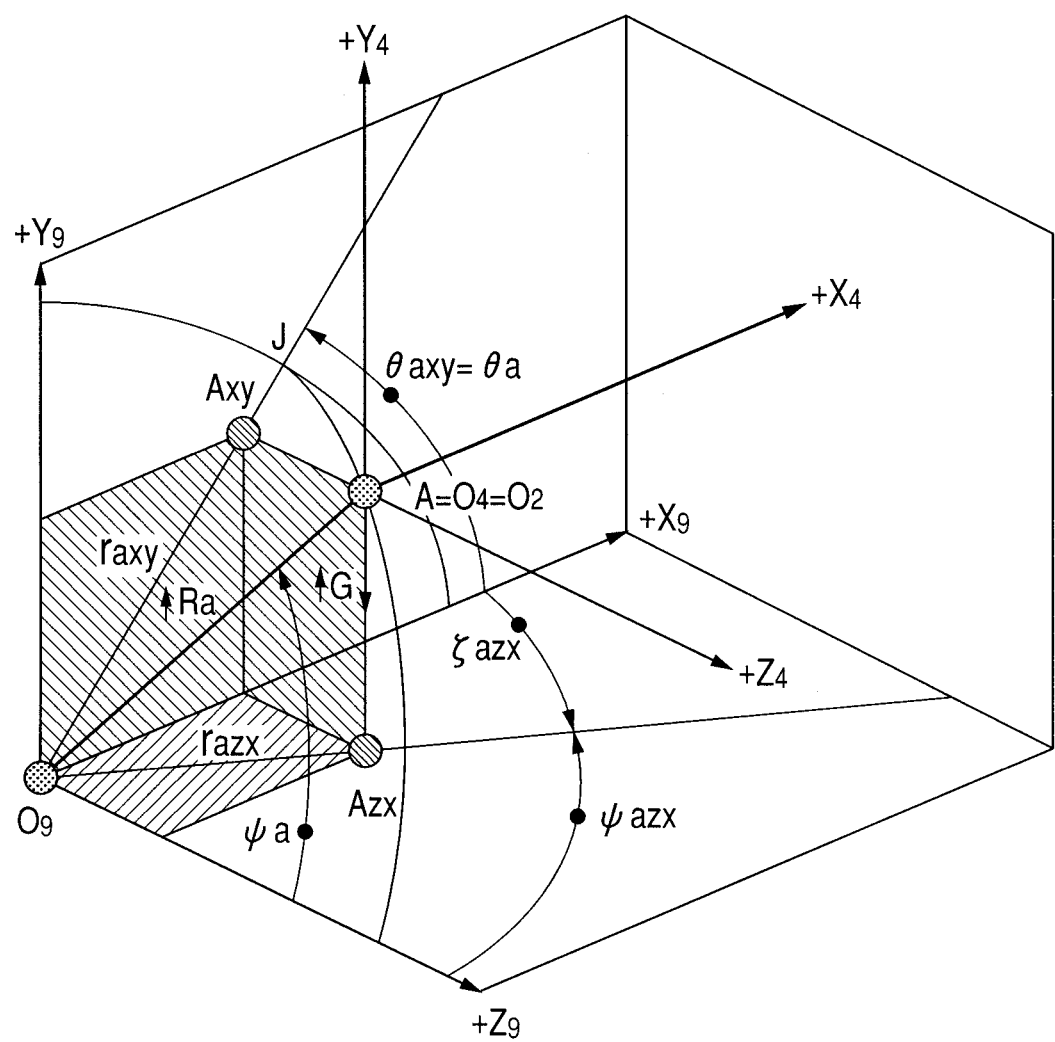
FIG. 11 is a coordinate map at the time of being projected to an $X_9Y_9$ plane and a $Z_9X_9$ plane.

Next, the coordinate expression when the $\vec{R}_a$ is projected onto the $X_9Y_9$ plane and the coordinate expression when it is projected onto the $Z_9X_9$ plane will be described with reference to FIG. 11. With FIG. 11, a moving coordinate system $O_4$-$X_4Y_4Z_4$ will be described. The moving coordinate system $O_4$-$X_4Y_4Z_4$ is also provided to the principal point A. An original $O_4$ is fixed to the principal point A. More specifically, the origin $O_4$ also moves with movement of the principal point A. A coordinate axis $+X_4$ is always disposed to be parallel with the coordinate axis $+X_9$, and a coordinate axis $+Y_4$ is always disposed parallel with the coordinate axis $+Y_9$. The parallelism is always kept when the principal point A moves. The direction of the gravity acceleration $\vec{G}$ at the principal point A is a minus direction of the coordinate axis $Y_9$.

Two-dimensional coordinate expression when being projected on the $X_9Y_9$ plane will be described. In FIG. 11, the point which is the principal point A projected on the $X_9Y_9$ plane is set as a principal point $A_{xy}$. The line segment between the origin $O_9$ and the principal point $A_{xy}$ is set as the scalar $r_{axy}$, and the angle to the scalar $r_{axy}$ from the $X_9$-axis with the origin $O_9$ as the center is set as $\theta_{axy}$. The angle $\theta_{axy}$ is the same angle as $\theta_a$ described above. In order to clarify the fact that this is the angle projected onto the $X_9Y_9$ plane, reference characters xy is assigned.

Figure 12:
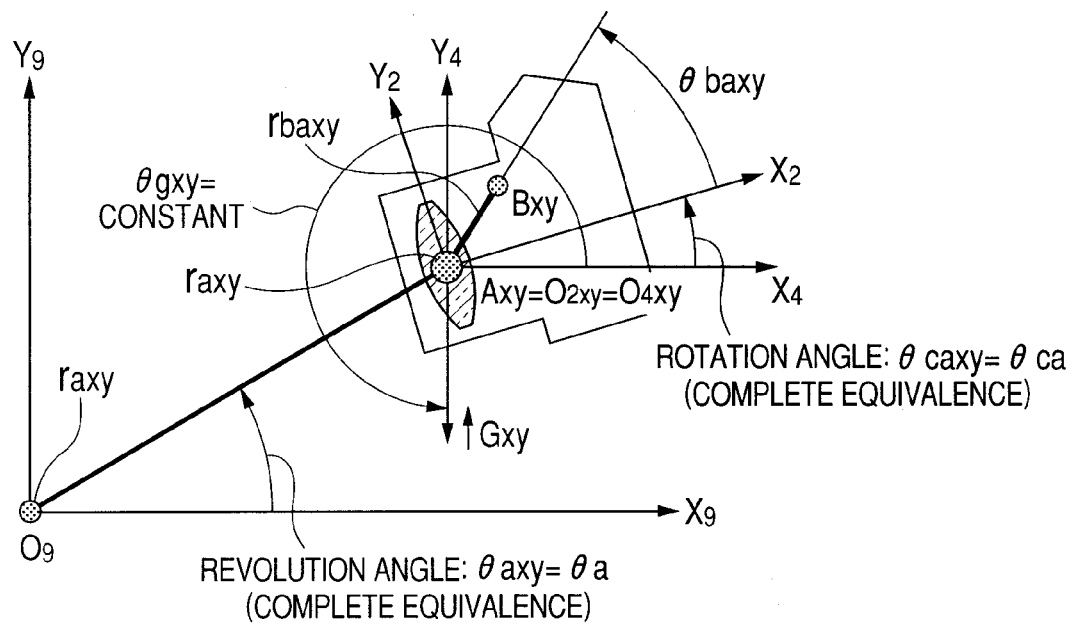
FIG. 12 is a diagram illustrating a camera state projected to the $X_9Y_9$ plane.

FIG. 12 illustrates the camera state projected on the $X_9Y_9$ plane. In this case, the outer shape and the lens of the camera are also illustrated. The origin $O_4$ of the coordinate system $O_4$-$X_4Y_4$ is fixed to the principal point $A_{xy}$, which is described above. When the principal point $A_{xy}$ is moved, the $X_4$-axis keeps a parallel state with the $X_9$-axis, and the $Y_4$-axis keeps a parallel state with the $Y_9$-axis.

As described above, the origin $O_2$ of the coordinate system $O_2$-$X_2Y_2$ is fixed to the principal point $A_{xy}$, and moves integrally with the camera. At this time, the $X_2$-axis is always matched with the optical axis of this camera. The angle at the time of being rotated to the $X_2$-axis from the $X_4$-axis with the origin $O_2$ as the center is set as $\theta_{caxy}$ (=$\theta_{ca}$: completely the same value). The gravity acceleration $\vec{G}_{xy}$ at the principal point $A_{xy}$ is in the positive rotation (counterclockwise) from the $X_4$-axis with the principal point $A_{xy}$ as the center, and the angle to $\vec{G}_{xy}$ is set as $\theta_{gxy}$. The $\theta_{gxy}$ is a constant value.

Here, the terms used in the present invention will be described. In the present invention, by being likened to the movement of the sun and the earth, the origin $O_9$ where the object is present is compared to the sun, and the principal point A of the camera is compared to the center of the earth. The angle $\theta_{axy}$ is called "the revolution angle" within the XY plane, and the angle $\theta_{caxy}$ is called "the rotation angle" within the XY plane. More specifically, this is similar to the fact that revolution indicates that the earth (camera) goes around the sun (object), whereas rotation indicates the earth (camera) itself rotates.

Figure 13:
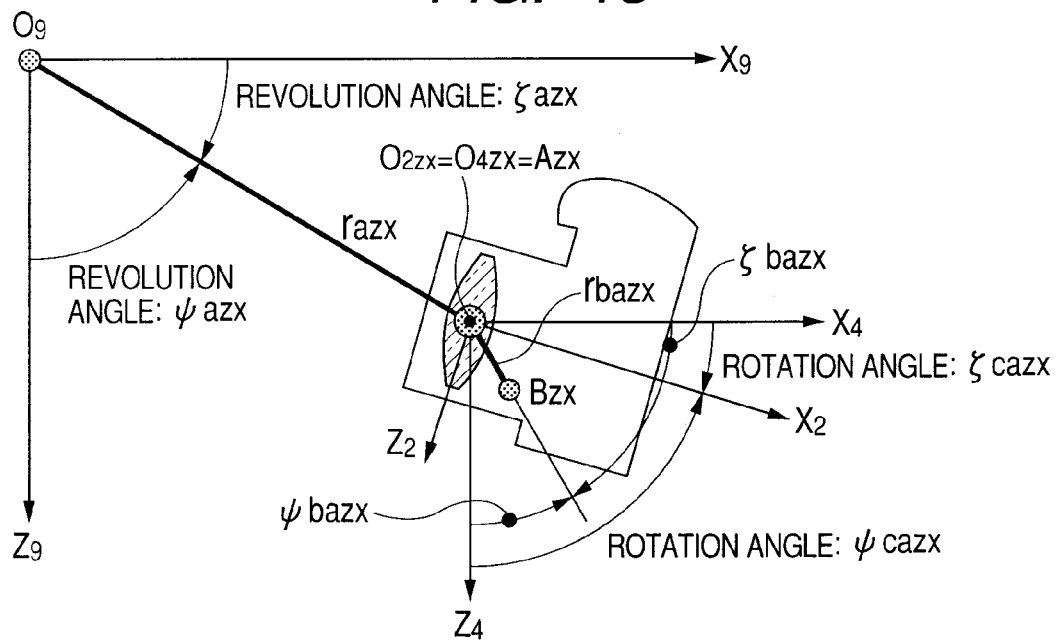
FIG. 13 is a diagram illustrating a camera state projected to the $Z_9X_9$ plane.

Next, two-dimensional coordinate expression when the camera is projected onto the $Z_9X_9$ plane will be described. FIG. 13 illustrates the camera state projected onto the $Z_9X_9$ plane. Here, the outer shape and the lens of the camera are also illustrated. The origin $O_4$ of the coordinate system $O_4$-$Z_4X_4$ is fixed to the principal point $A_{zx}$. When the principal point $A_{zx}$ is moved, the $Z_4$-axis keeps a parallel state with the $Z_9$-axis, and the $X_4$-axis keeps a parallel state with the $X_9$-axis.

The origin $O_2$ of the coordinate system $O_2$-$Z_2X_2$ is fixed to the principal point $A_{zx}$, and moves integrally with the camera. At this time, the $X_2$-axis is always matched with the optical axis of the camera. The angle at the time of being rotated to the $X_2$-axis from the $Z_4$-axis with the origin $O_2$ as the center is set as $\psi_{cazx}$. Further, the angle at the time of being rotated to the $X_2$-axis from the $X_4$-axis with the origin $O_2$ as the center is set as $\zeta_{cazx}$.

Figure 14:
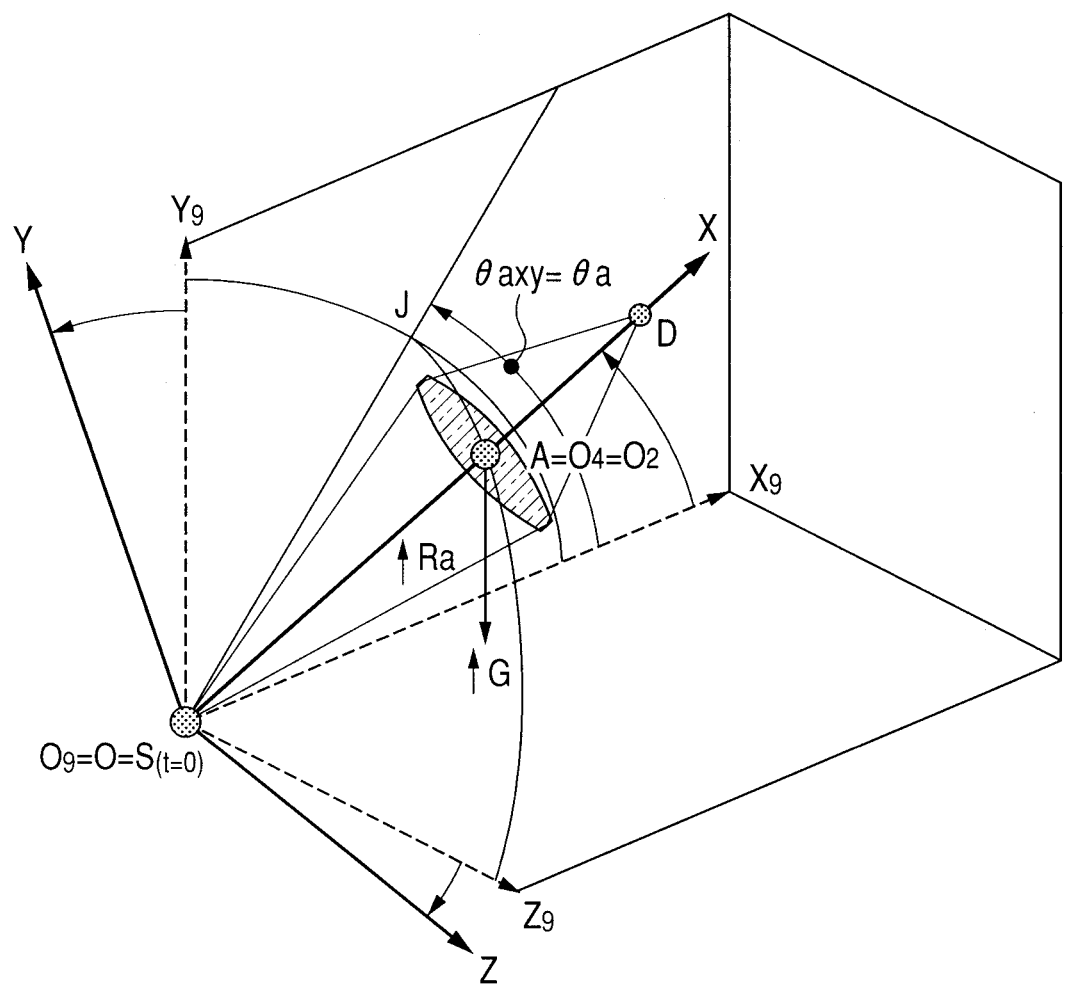
FIG. 14 is a view of a camera initial state at an initial time $t=0$.

In the three-dimensional coordinate system of FIG. 14, a camera initial state at an initial time of a time t=0 will be described. The description will be made on the assumption that in the fixed coordinate system $O_9$-$X_9Y_9Z_9$, a photographer causes the object S(t=0) to be shot to correspond to the center of the finder or the liquid crystal display (LCD), and the object S(t=0) is on the optical axis for convenience in this case. The origin $O_9$ is caused to correspond to the object S(t=0). The principal point A of the shooting optical system 105 and the imaging point D where the image of the object S(t=0) is formed are geometric-optically present on the optical axis of a straight line. The gravity acceleration $\vec{G}$ at the position of the principal point A is in the minus direction of the coordinate axis $Y_9$.

If the photographer causes the object S desired to be shot to correspond to the autofocus (AF) frame other than the center of the finder or the liquid crystal display (LCD), the line segment connecting the object S and the principal point A is set as a $\vec{Ra}$, and may be modeled.

Next, a new fixed coordinate system O-XYZ is set. The origin O of the fixed coordinate system O-XYZ is caused to correspond to the origin $O_9$, and the coordinate axis X is caused to correspond to the optical axis of the camera. The direction of the coordinate axis Y is set so that the coordinate axis $Y_9$ is present within the XY plane. If the coordinate axis X and the coordinate axis Y are set, the coordinate axis Z is uniquely set.

Figure 15:
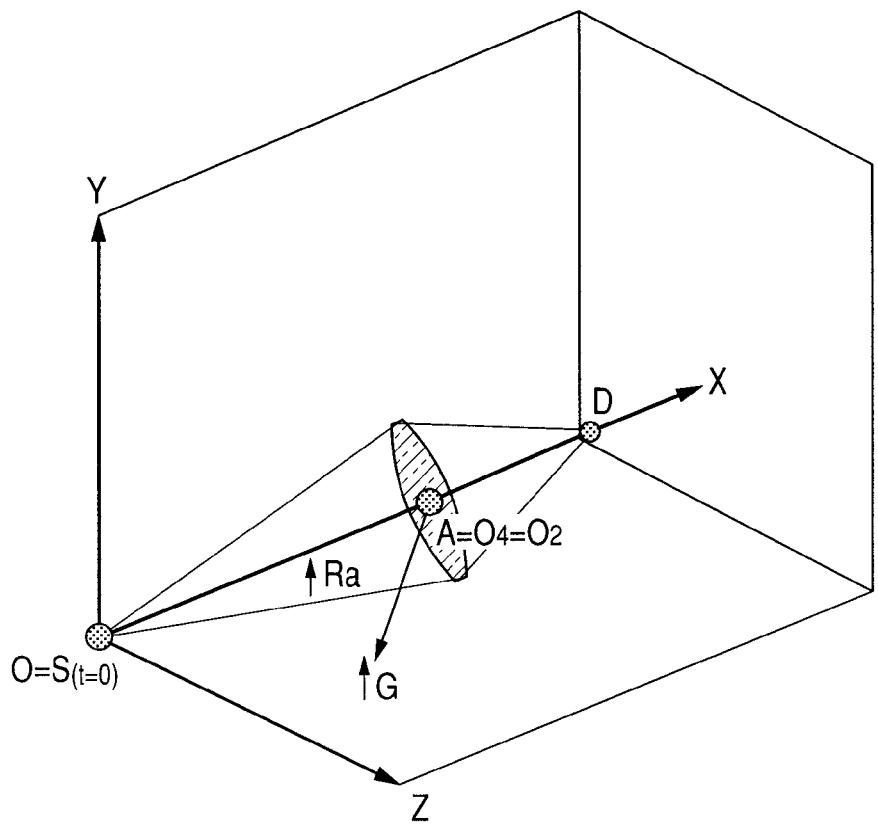
FIG. 15 is a view of a camera initial state in an O-XYZ coordinate system.

As illustrated in FIG. 15, for convenience of description, the fixed coordinate system $O_9$-$X_9Y_9Z_9$ will not be illustrated, and only the fixed coordinate system O-XYZ will be illustrated as the fixed coordinate system hereinafter. By the aforementioned definition of the coordinate system, in the initial state at the time t=0, the gravity acceleration $\vec{G}$ is present within the XY plane.

Figure 16:
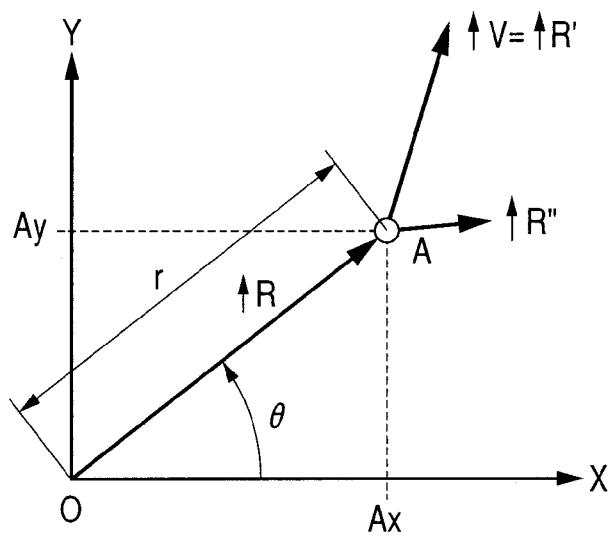
FIG. 16 is a basic explanatory diagram of a polar coordinate system.

Next, the blur expression showing the relationship of the camera shake and image movement is derived. In order to facilitate expression of the mathematical expression, polar coordinate system expression is used. Further, the first order derivative and the second order derivative of the vector and the angle are performed. Thus, by using FIG. 16 which is a basic explanatory diagram of a polar coordinate system, the meaning of the codes in the mathematical expression which is common and used here will be described. The positional expression of the point A which is present on the coordinate system O-XY is shown by a position $\vec{R}$. The position $\vec{R}$ is the function of a time, and can be also described as $\vec{R}(t)$.

Position Vector:

$$\vec{R}(t) = r(t)e^{j\theta(t)} \quad (1)$$
$$= \vec{R}$$
$$= re^{j\theta}$$
$$= r\cos\theta + jr\sin\theta$$

The real term $r\cos\theta$ is the X-direction component, and the imaginary term $jr\sin\theta$ is the Y-direction component. Expressed in the orthogonal coordinate system, the X-direction component is $A_x = r\cos\theta$, and the Y-direction component is $A_y = r\sin\theta$.

Next, the velocity $\vec{V} = \dot{\vec{R}}$ is obtained by first order derivative of the position $\vec{R}$ by the time t.

Velocity Vector:

$$\vec{V} = \dot{\vec{R}} \quad (2)$$
$$= \dot{r}e^{j\theta} + r\dot{\theta}e^{j(\theta+\pi/2)}$$

Expressed in the orthogonal coordinate system, the X-direction component is $$V_x = \dot{A}_x = \dot{r}\cos\theta + r\dot{\theta}\cos(\theta+\pi/2),$$

and the Y-direction component is $$V_y = \dot{A}_y = \dot{r}\sin\theta + r\dot{\theta}\sin(\theta+\pi/2).$$

Next, the acceleration $\ddot{\vec{R}}$ is obtained by the first order derivative of the velocity $\dot{\vec{R}}$ by the time t.

Acceleration Vector:

$$\ddot{\vec{R}} = \ddot{r}e^{j\theta} + r\dot{\theta}^2 e^{j(\theta+\pi)} + r\ddot{\theta}e^{j(\theta+\pi/2)} + 2\dot{r}\dot{\theta}e^{j(\theta+\pi/2)} \quad (3)$$

where
the first term: $\ddot{r}e^{j\theta}$ represents the acceleration component of a change of the length r,
the second term: $r\dot{\theta}^2 e^{j(\theta+\pi)}$ represents the centripetal force component,
the third term: $r\ddot{\theta}e^{j(\theta+\pi/2)}$ represents the angular acceleration component, and
the fourth term: $2\dot{r}\dot{\theta}e^{j(\theta+\pi/2)}$ represents the Coriolis force component.

Expressed in the orthogonal coordinate system, the acceleration vector is obtained by the following expressions (4a) and (4b).

X-Direction Component $\ddot{A}_x$:

$$\ddot{A}_x = \ddot{r}\cos\theta + r\dot{\theta}^2\cos(\theta+\pi) + r\ddot{\theta}\cos(\theta+\pi/2) + 2\dot{r}\dot{\theta}\cos(\theta+\pi/2) \quad (4a)$$

Y-Direction Component: $\ddot{A}_y$:

$$\ddot{A}_y = \ddot{r}\sin\theta + r\dot{\theta}^2\sin(\theta+\pi) + r\ddot{\theta}\sin(\theta+\pi/2) + 2\dot{r}\dot{\theta}\sin(\theta+\pi/2) \quad (4b)$$

Figure 17:
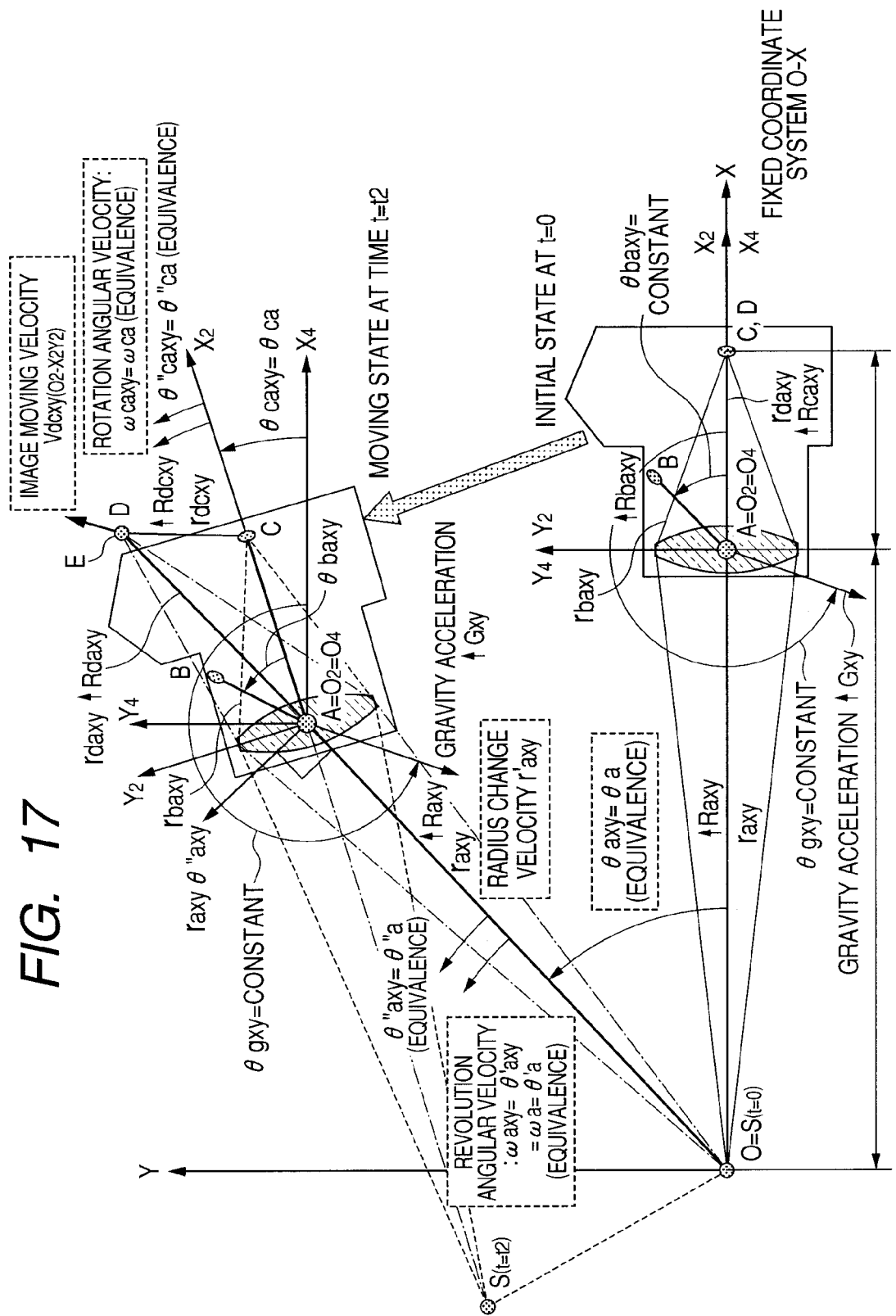
FIG. 17 is a diagram illustrating a camera state which is projected to a two-dimensional XY coordinate system.

The theoretical formula of the present invention will be described in the two-dimensional XY coordinate system when the camera is projected onto the XY plane illustrated in FIG. 17. In FIG. 17, setting of the coordinate system and codes of the two-dimensional XY coordinate system will be also described. Description will be made by partially including the content which is already described.

The object S is disposed on the fixed coordinate system O-XY. In the initial state drawing at a time t=0, the codes will be described. In the initial state (t=0), the optical axis of the camera corresponds to the coordinate axis X of the fixed coordinate system O-XY. In the initial state (t=0), the object S corresponds to the origin O of the fixed coordinate system O-XY. In the fixed coordinate system O-XY, the principal point A is expressed by the $\vec{R}_{axy}$. The line segment length between the origin O and the principal point A of the camera is set as the scalar $r_{axy}$, and the point where the origin O forms an image by the lens is set as an image forming point D. A point C is a center point of the image pickup device 203, and in the initial state (t=0), the imaging point D corresponds to the point C.

In the moving state diagram at a certain time (t=t2), the codes will be descried. The origin $O_4$ of the coordinate system $O_4$-$X_4Y_4$ is fixed to the principal point A, the coordinate axis $X_4$ is always kept parallel with the coordinate axis X, and the coordinate axis $Y_4$ is always kept parallel with the coordinate axis Y. The origin $O_2$ of the coordinate system $O_2$-$X_2Y_2$ is fixed to the principal point A, and the coordinate axis $X_2$ is always kept in the optical axis direction of the camera.

The accelerometer 121 is fixed to the point B inside the camera, and is expressed by $\vec{R}_{baxy}$ in the coordinate system $O_2$-$X_2Y_2$. The length of a line segment AB is set as the scalar $r_{baxy}$, and the angle rotated to the line segment AB from the coordinate axis $X_2$-axis with the origin $O_2$ as the center is set as $\theta_{baxy}$.

The image of the origin O forms an image at the position of a point D differing from the point C of the image pickup device center by the lens. The imaging point D with the principal point A as the reference is expressed by $\vec{R}_{daxy}$. The point D with the point C as the reference is expressed by $\vec{R}_{dcxy}$. A scalar $r_{dcxy}$ which is the length from the point C to the point D is the length by which the image forming point D moves from the time t=0 to t2. The relative moving velocity vector of the image forming point D with respect to the point C in the moving coordinate system $O_2$-$X_2Y_2$ at a certain time t2 is set as $\vec{V}_{dcxy(O_2-X_2Y_2)}$.

In the fixed coordinate system O-XY, the angle formed to the $\vec{R}_{axy}$ from the coordinate axis X with the origin O as the center is set as a rotation angle $\theta_{axy}$. In the moving coordinate system $O_4$-$X_4Y_4$, the angle formed from the coordinate axis $X_4$ to the coordinate axis $X_2$ with the origin $O_4$ as the center is set as a revolution angle $\theta_{caxy}$.

The first order derivative of the $\vec{R}_{axy}$ by the time t is described as $\dot{\vec{R}}_{axy}$, and the second order derivative of it is described as $\ddot{\vec{R}}_{axy}$. The $\vec{R}_{caxy}$ is similarly described as $\dot{\vec{R}}_{caxy}$ and $\ddot{\vec{R}}_{caxy}$, the $\vec{R}_{daxy}$ is similarly described as a $\dot{\vec{R}}_{daxy}$ and $\ddot{\vec{R}}_{daxy}$, and the revolution angle $\theta_{axy}$ is similarly described as $\dot{\theta}_{axy}$ and $\ddot{\theta}_{axy}$, and the rotation angle $\theta_{caxy}$ is similarly described as $\dot{\theta}_{caxy}$ and $\ddot{\theta}_{caxy}$.

At a certain time t2, a relative moving velocity $\vec{V}_{dcxy(O_2-X_2Y_2)}$ of the imaging point D with the point C as the reference in the moving coordinate system $O_2$-$X_2Y_2$ is obtained. A moving velocity $\vec{V}_{daxy(O-XY)}$ at the imaging point D in the fixed coordinate system O-XY is obtained by the following expression (5).

$$\vec{V}_{daxy(O-XY)} = \dot{\vec{R}}_{daxy(O-XY)} \qquad (5)$$
$$= \dot{r}_{daxy} e^{j\theta_{daxy}} + r_{daxy}\dot{\theta}_{daxy} e^{j(\theta_{daxy}+\pi/2)}$$
$$= \dot{r}_{daxy} e^{j\theta_{axy}} + r_{daxy}\dot{\theta}_{axy} e^{j(\theta_{axy}+\pi/2)}$$
$$\therefore \dot{\theta}_{daxy} = \dot{\theta}_{axy}$$

The moving velocity $\vec{V}_{caxy(O-XY)}$ of the image pickup device center C in the fixed coordinate system O-XY is obtained by the following expression (6).

$$\vec{V}_{caxy(O-XY)} = \dot{\vec{R}}_{caxy(O-XY)} \qquad (6)$$
$$= \dot{r}_{caxy} e^{j\theta_{caxy}} + r_{caxy}\dot{\theta}_{caxy} e^{j(\theta_{caxy}+\pi/2)}$$
$$= r_{caxy}\dot{\theta}_{caxy} e^{j(\theta_{caxy}+\pi/2)}$$
$$\therefore \dot{r}_{caxy} = 0$$

Expression (7) is derived from the image formation formula of geometrical optics, $$1/f = 1/r_{axy} + 1/r_{daxy} \qquad (7),$$

where f represents focal length of the optical system. Expression (7) is modified.

$$r_{daxy} = \frac{f r_{axy}}{r_{axy} - f}$$
$$\dot{r}_{daxy} = f\dot{r}_{axy}(r_{axy} - f)^{-1} - f r_{axy}\dot{r}_{axy}(r_{axy} - f)^{-2}$$

From the above expression, the relative moving velocity $\vec{V}_{dcxy(O-XY)}$ of the imaging point D with respect to the point C in the fixed coordinate system O-XY is obtained from the following expression (8).

$$\vec{V}_{dcxy} = \dot{\vec{R}}_{dcxy} \qquad (8)$$
$$= \vec{V}_{dxy} - \vec{V}_{cxy}$$
$$= (\vec{V}_{daxy} - \vec{V}_{axy}) - (\vec{V}_{caxy} + \vec{V}_{axy})$$
$$= \vec{V}_{daxy} - \vec{V}_{caxy}$$
$$= \dot{r}_{daxy} e^{j\theta_{axy}} + r_{daxy}\dot{\theta}_{axy} e^{j(\theta_{axy}+\pi/2)} - r_{caxy}\dot{\theta}_{caxy} e^{j(\theta_{caxy}+\pi/2)}$$
$$= [f\dot{r}_{axy}(r_{axy} - f)^{-1} - f r_{axy}\dot{r}_{axy}(r_{axy} - f)^{-2}] e^{j\theta_{axy}} +$$
$$f r_{axy}(r_{axy} - f)^{-1}\dot{\theta}_{axy} e^{j(\theta_{axy}+\pi/2)} - r_{caxy}\dot{\theta}_{caxy} e^{j(\theta_{caxy}+\pi/2)}$$

The relationship between the scalar $r_{caxy}$ and the scalar $r_{axy(t=0)}$ is obtained from the following expression (9).

$$r_{caxy} = r_{daxy(t=0)} \qquad (9)$$
$$= f \cdot r_{axy(t=0)} \cdot (r_{axy(t=0)} - f)^{-1} = (1+\beta)f$$

By substituting the above described expression, the relative moving velocity $\vec{V}_{dcxy(O-XY)}$ in the fixed coordinate system O-XY is obtained by the following expression (10).

$$\vec{V}_{dcxy(O-XY)} = [f\dot{r}_{axy}(r_{axy}-f)^{-1} - f r_{axy}\dot{r}_{axy}(r_{axy}-f)^{-2}] e^{j\theta_{axy}} +$$
$$f r_{axy}(r_{axy}-f)^{-1}\dot{\theta}_{axy} e^{j(\theta_{axy}+\pi/2)} - (1+\beta)f\dot{\theta}_{caxy} e^{j(\theta_{caxy}+\pi/2)} \qquad (10)$$

Next, the coordinate is converted from the fixed coordinate system O-XY into the moving coordinate system $O_2$-$X_2Y_2$ fixed onto the camera. For this, the $\vec{V}_{dcxy(O-XY)}$ is rotated by the rotation angle $(-\theta_{caxy})$. Therefore, the image movement velocity $\vec{V}_{dcxy(O-X_2Y_2)}$ in the moving coordinate system $O_2$-$X_2Y_2$ fixed on the camera is obtained from the following expression (11).

$$\vec{V}_{dcxy(O_2-X_2Y_2)} = \vec{V}_{dcxy(O_2-X_2Y_2)} e^{j(-\theta_{caxy})} \qquad (11)$$
$$= [f\dot{r}_{axy}(r_{axy} - f)^{-1} - f r_{axy}\dot{r}_{axy}(r_{axy} - f)^{-2}]$$
$$e^{j(\theta_{axy}-\theta_{caxy})} +$$
$$f r_{axy}(r_{axy} - f)^{-1}\dot{\theta}_{axy} e^{j(\theta_{axy}+\pi/2-\theta_{caxy})} -$$
$$(1+\beta)f\dot{\theta}_{caxy} e^{j(\theta_{caxy}+\pi/2-\theta_{caxy})}$$

When the expression is further organized, the aforementioned expression (12) is obtained. Since the image movement velocity $\vec{V}_{dcxy(O_2-X_2Y_2)}$ in the moving coordinate system $O_2$-$X_2Y_2$ is the relative image movement velocity with respect to the image pickup surface of the camera, the expression is a strict expression strictly expressing the movement of the image which is actually recorded as an image. In this strict expression, the imaginary part, namely, the coordinate axis $Y_2$ direction component is the image movement component in the vertical direction of the camera within the image pickup surface. Further, the real part of expression (12), namely, the coordinate axis $X_2$ direction component is the image movement component in the optical axis direction of the camera, and is a component by which a so-called blurred image occurs.

The shake of the camera supported by the hand of a photographer is considered to be a vibration movement with a very small amplitude with a certain point in the space as the center, and therefore, the image movement velocity $\vec{V}_{dcxy(O_2-X_2Y_2)}$ in the moving coordinate system $O_2-X_2Y_2$ which is strictly obtained is transformed into an approximate expression under the following conditions.

The state at the certain time t2 is assumed to be the vibration in the vicinity of the initial state at the time t=0, and the following expression (13) is obtained.

$$r_{axy} \approx (1+\beta)f/\beta \tag{13}$$

When transformed, obtaining $$r_{axy}-f \approx f/\beta. \therefore f \cdot r_{axy}/(r_{axy}-f)=f(1-\beta)(f/\beta)/(f/\beta)=f(1+\beta).$$

If this, $\dot{r}_{axy} \approx 0$, and $\theta_{axy}\pi/2-\theta_{caxy} \approx \pi/2$ are substituted into $\vec{V}_{dcxy(O_2-X_2Y_2)}$, the following expression (14) is derived.

$$\vec{V}_{dcxy(O_2-X_2Y_2)} = V_{dcxy(O-XY)}e^{j(-\theta_{caxy})}$$
$$\approx [f \times 0 \times (r_{axy}-f)^{-1} - fr_{axy} \times 0 \times (r_{axy}-f)^{-2}]$$
$$e^{j(\theta_{axy}-\theta_{caxy})} + (1+\beta)f\dot{\theta}_{axy}e^{j(\pi/2)} -$$
$$(1+\beta)f\dot{\theta}_{caxy}e^{j(\pi/2)}$$
$$\approx -(1+\beta)f(\dot{\theta}_{caxy}-\dot{\theta}_{axy})e^{j(\pi/2)}$$

Therefore, the approximate theoretical formula of the image movement velocity $\vec{V}_{dcxy(O_2-X_2Y_2)}$ in the moving coordinate system $O_2-X_2Y_2$ within the XY plane becomes the aforementioned expression (15). The component representing the direction of the image movement vector of the right side of expression (15) is $e^{j\pi/2}$, and therefore, the image movement direction is the $Y_2$-axis direction in the direction at 90 degrees from the $X_2$-axis. $\dot{\theta}_{caxy}$ represents the rotation angular velocity around the principal point A, and $\dot{\theta}_{axy}$ represents the revolution angular velocity of the principal point A around the origin O of the fixed coordinate system. $\beta$ represents an imaging magnification of this optical system, and f represents the actual focal length. $(1+\beta)f$ represents an image side focal length. Therefore, this approximate expression means that the image movement velocity in the $Y_2$ direction within the image pickup surface is $-$(image side focal length)$\times$(value obtained by subtracting the revolution angular velocity from the rotation angular velocity).

Figure 18:
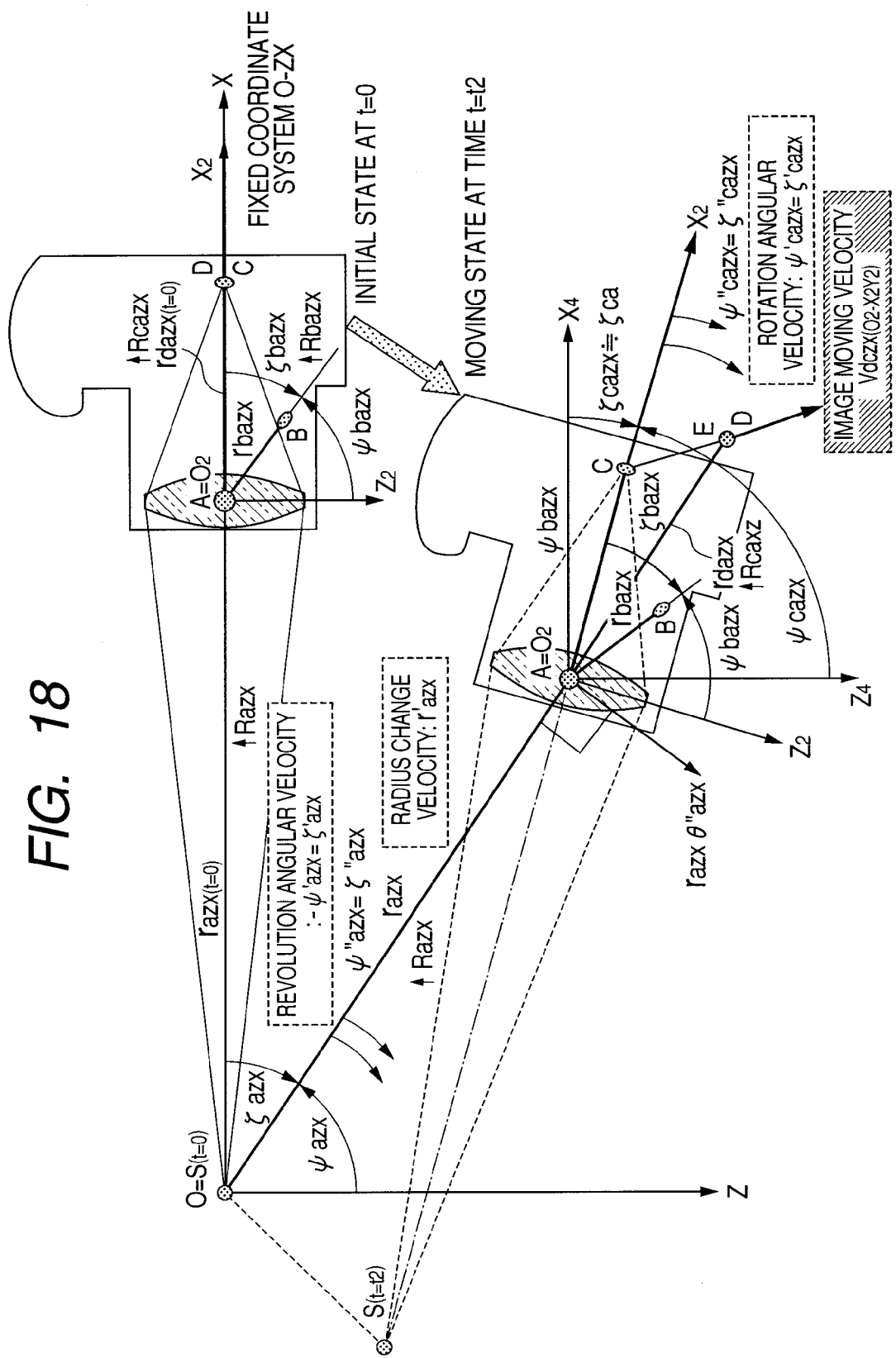
FIG. 18 is a diagram illustrating a camera state projected to a two-dimensional ZX coordinate system.

With FIG. 18, the image movement theoretical formula of the present invention in the two-dimensional ZX coordinate system when projected onto the ZX plane will be described. When the shake is a very small vibration movement with the initial state position as the center, the approximate conditions are such that $\zeta_{azx} \approx 0$, $\zeta_{cazx} \approx 0$, $r_{azx} \approx$ constant value, $\dot{r}_{azx} \approx 0$, and $\ddot{r}_{azx} \approx 0$. From the approximate conditions, the approximate theoretical formula of the image movement velocity $\vec{V}_{dcxy(O_2-Z_2Y_2)}$ in the moving coordinate system $O_2-Z_2X_2$ within the ZY plane is as the following expression (16) by the procedure similar to the approximate formula $V_{dcxy(O2-X2Y2)}$ in the XY plane.

$$\vec{V}_{dczx(O_2-Z_2X_2)} \approx -(1+\beta)f(\dot{\zeta}_{cazx}-\dot{\zeta}_{azx})e^{j\pi/2} \tag{16}$$

The component representing the direction of the image blur vector of the right side of expression (16) is $e_{j\pi/2}$, and therefore, the image movement direction is the $Z_2$-axis direction in the direction at 90 degrees from the $X_2$-axis. $\dot{\zeta}_{cazx}$ represents a rotation angular velocity around the principal point A, and $\dot{\zeta}_{azx}$ represents a revolution angular velocity of the principal point A around origin O of the fixed coordinate system. $\beta$ represents the imaging magnification of this optical system, and f represents the actual focal length of this optical system. $(1+\beta)f$ represents the image side focal length. Therefore, the approximate formula means that the image movement velocity in the $X_2$ direction within the image pickup device surface is $-$(image side focal length)$\times$(value obtained by subtracting the revolution angular velocity from the rotation angular velocity).

The output signal of the accelerometer 121 will be also described. In the XY coordinate plane, the revolution angular velocity at the principal point A can be expressed as follows.

$\dot{\theta}_{axy}=\int$(acceleration component orthogonal to the line segment $r_{axy}$ at the point $A$)$dt/r_{axy}$ Therefore, the acceleration $\ddot{\vec{R}}_a$ can be measured and calculated. In this embodiment, the accelerometer 121 is fixed to the point B, and therefore, the acceleration value at the point A needs to be obtained by calculation based on the output of the accelerometer at the point B. Here, the difference value between the acceleration at the point B and that at the principal point A where the accelerometer is actually disposed, and the theoretical acceleration value at the point B are obtained. The component (term) which is unnecessary in image blur control is clarified.

First, an acceleration vector $\ddot{\vec{R}}_{a(O-XY)}$ which occurs at the principal point A in the fixed coordinate system O-XY is obtained from the following expression (17).

$\ddot{\vec{R}}_{a(O-XY)}$ $=\ddot{r}_{axy}e^{j\theta_{axy}}$ (first term: acceleration component of a change of length $r_a$)

$+r_{axy}\dot{\theta}_{axy}^2 e^{j(\theta_{axy}+\pi)}$ (second term: centripetal force)

$+r_{axy}\ddot{\theta}_{axy}e^{j(\theta_{axy}+\pi/2)}$ (third term: angular acceleration component)

$2\dot{r}_{axy}\dot{\theta}_{axy}e^{j(\theta_{axy}+\pi/2)}$ (fourth term: Coriolis force component)

$+Ge^{j(\theta_{gxy}-\pi)}$ (acceleration component of the gravity G) (17)

(Here, the gravity G works onto the accelerometer 121 as a reaction force, and therefore, 180 degrees is subtracted from the angle $\theta_{gxy}$ representing the gravity direction.)

A relative acceleration $\ddot{\vec{R}}_{baxy(O-XY)}$ at the point B with respect to the principal point A in the fixed coordinate system O-XY will be obtained. First, a relative position $\vec{R}_{baxy(O-XY)}$ is obtained from the following expression (18).

$$\vec{R}_{baxy(O-XY)}=r_{ba}e^{j(\theta_{ba}+\theta_{ca})} \tag{18}$$

If the first order derivative of expression (18) is performed by the time t, the velocity vector can be obtained. Since the points A and B are fixed to the same rigid body, a relative velocity $\dot{\vec{R}}_{baxy(O-XY)}$ is obtained from the following expression (19) from $r_{baxy}$=constant value, $\dot{r}_{baxy}$=0, $\theta_{baxy}$=constant value, $\dot{\theta}_{baxy}$=0, and $\dot{\theta}_{caxy}$=rotation component (variable).

$$\dot{\vec{R}}_{baxy(O-XY)} = \dot{r}_{baxy}e^{j(\theta_{baxy}+\theta_{caxy})} + \qquad(19)$$
$$r_{baxy}(\dot{\theta}_{baxy}+\dot{\theta}_{caxy}\theta)e^{j(\theta_{baxy}+\theta_{caxy}+\pi/2)}$$
$$= (0)e^{j\theta_{baxy}} + r_{baxy}(0+\dot{\theta}_{caxy})e^{j(\theta_{baxy}+\theta_{caxy}+\pi/2)}$$
$$= r_{baxy}\dot{\theta}_{caxy}e^{j(\theta_{baxy}+\theta_{caxy}+\pi/2)}$$

Next, the acceleration vector is obtained. The relative acceleration vector $\ddot{\vec{R}}_{baxy(O-XY)}$ at the point B (accelerometer position) with respect to the point A in the fixed coordinate system O-XY is obtained from the following expression (20).

$$\ddot{\vec{R}}_{baxy(O-XY)} = \ddot{r}_{baxy}e^{j(\theta_{baxy}+\theta_{caxy})} + \qquad(20)$$
$$r_{baxy}(\dot{\theta}_{baxy}+\dot{\theta}_{caxy})^2 e^{j(\theta_{baxy}+\theta_{caxy}+\pi)} +$$
$$r_{baxy}(\ddot{\theta}_{baxy}+\ddot{\theta}_{caxy})e^{j(\theta_{baxy}+\theta_{caxy}+\pi/2)} +$$
$$2\dot{r}_{baxy}(\dot{\theta}_{baxy}+\dot{\theta}_{caxy})e^{j(\theta_{baxy}+\theta_{caxy}+\pi/2)}$$
$$= 0 \times e^{j(\theta_{baxy}+\theta_{caxy})} +$$
$$r_{baxy}(0+\dot{\theta}_{caxy})^2 e^{j(\theta_{baxy}+\theta_{caxy}+\pi)} +$$
$$r_{baxy}(0+\ddot{\theta}_{caxy})e^{j(\theta_{baxy}+\theta_{caxy}+\pi/2)} +$$
$$2 \times 0 \times (0+\dot{\theta}_{caxy})e^{j(\theta_{baxy}+\theta_{caxy}+\pi/2)}$$
$$= r_{baxy}(\dot{\theta}_{caxy})^2 e^{j(\theta_{baxy}+\theta_{caxy}+\pi)} +$$
$$r_{baxy}(\ddot{\theta}_{caxy})e^{j(\theta_{baxy}+\theta_{caxy}+\pi/2)}$$

( = centripetal force + angular acceleration amount)

The expression value is the movement vector error amount due to the fact that the accelerometer 121 is actually mounted at the position B with respect to the principal point A which is an ideal position.

An acceleration $\ddot{\vec{R}}_{bxy(O-XY)}$ at the point B in the fixed coordinate system O-XY is expressed by the sum of the vectors from the origin O to the principal point A already obtained and from the principal point A to the point B. First, the position $\vec{R}_{bxy(O-XY)}$ at the point B in the fixed coordinate system O-XY is expressed by way of the principal point A by the following expression (21).

Position Vector:

$$\vec{R}_{bxy(O-XY)} = r_{bxy}e^{j\theta_{bxy}} \qquad(21)$$
$$= \vec{R}_{axy} + \vec{R}_{baxy}$$
$$= r_{axy}e^{j\theta_{axy}} + r_{baxy}e^{j(\theta_{baxy}+\theta_{caxy})}$$

Velocity Vector:

$$\dot{\vec{R}}_{bxy(O-XY)} = \dot{r}_{bxy}e^{j\theta_{bxy}} + r_{bxy}\dot{\theta}_{bxy}e^{j(\theta_{bxy}+\pi/2)} \qquad(22)$$
$$= \dot{\vec{R}}_{axy} + \dot{\vec{R}}_{baxy}$$

-continued
$$= \dot{r}_{axy}e^{j\theta_{axy}} + r_{axy}\dot{\theta}_{axy}e^{j(\theta_{axy}+\pi/2)} +$$
$$r_{baxy}\dot{\theta}_{caxy}e^{j(\theta_{baxy}+\theta_{caxy}+\pi/2)}$$

Acceleration Vector:

$$\ddot{\vec{R}}_{bxy(O-XY)} = \ddot{\vec{R}}_{axy} + \ddot{\vec{R}}_{baxy} \qquad(23)$$
$$= \ddot{r}_{axy}e^{j\theta_{axy}} + r_{axy}\dot{\theta}_{axy}^2 e^{j(\theta_{axy}+\pi)} + r_{axy}\ddot{\theta}_{axy}e^{j(\theta_{axy}+\pi/2)} +$$
$$2\dot{r}_{axy}\dot{\theta}_{axy}e^{j(\theta_{axy}+\pi/2)} + r_{baxy}\dot{\theta}_{caxy}^2 e^{j(\theta_{baxy}+\theta_{caxy}+\pi)} +$$
$$r_{baxy}\ddot{\theta}_{caxy}e^{j(\theta_{baxy}+\theta_{caxy}+\pi/2)} + Ge^{j(\theta_{gxy}-\pi)}$$

Next, an acceleration $\ddot{\vec{R}}_{bxy(O_2-X_2Y_2)}$ at the point B in the moving coordinate system $O_2$-$X_2Y_2$ will be calculated. The latitude (scalar) of the acceleration desired to be calculated is in the fixed coordinate system O-XYZ where the object is present. Further, the acceleration is fixed to the moving coordinate system $O_2$-$X_2Y_2$, the three axes of the accelerometer 121 are oriented in the $X_2$-axis direction, the $Y_2$-axis direction and the $Z_2$-axis direction, and the acceleration component needs to be expressed by the coordinate axis directions of the moving coordinate system $O_2$-$X_2Y_2Z_2$.

The disposition state of the accelerometer 121 will be described in detail. The accelerometer 121 of three-axis outputs is disposed at the point B. In the moving coordinate system $O_2$-$X_2Y_2Z_2$, the axes of the accelerometer are set to an accelerometer output $A_{ccx2}$ with the sensitivity direction in the direction parallel with the $X_2$-axis, an accelerometer output $A_{ccy2}$ with the sensitivity direction in the direction parallel with the $Y_2$-axis, and an accelerometer output $A_{ccz2}$ with the sensitivity direction in the direction parallel with the $Z_2$-axis. Since the movement in the XY plane is described here, the accelerometer output $A_{ccx2}$ and the accelerometer output $A_{ccy2}$ will be described.

In order to obtain the acceleration $\ddot{\vec{R}}_{bxy(O-X_2Y_2)}$ by converting the acceleration $\ddot{\vec{R}}_{bxy(O-XY)}$ at the point B in the fixed coordinate system O-XY obtained in the above, into the components in the $X_2$-axis and $Y_2$-axis direction with the origin O as it is, the coordinate conversion may be performed in the direction opposite to the rotation angle $\theta_{caxy}$ of the camera. Therefore, the following expression (24) is established.

Accelerometer Output:

$$\vec{A}_{cc(O-X_2Y_2)} = \ddot{\vec{R}}_{bxy(O-XY)}e^{j(-\theta_{caxy})}$$
$$= \ddot{r}_{axy}e^{j(\theta_{axy}-\theta_{caxy})}$$

(first term: optical axis direction movement)

$$+r_{axy}\dot{\theta}_{axy}e^{j(\theta_{axy}-\theta_{caxy}+\pi)}$$

(second term: centripetal force of revolution)

$$+r_{axy}\ddot{\theta}_{axy}e^{j(\theta_{axy}-\theta_{caxy}+\pi/2)}$$

(third term: acceleration of revolution)

$$+2\dot{r}_{axy}\dot{\theta}_{axy}e^{j(\theta_{axy}-\theta_{caxy}+\pi/2)}$$

(fourth term: Coiolis force)

$$+r_{baxy}\dot{\theta}_{caxy}^2 e^{j(\theta_{baxy}+\theta_{caxy}-\theta_{caxy}+\pi)}$$

(fifth term: centripetal force of rotation)

$+r_{baxy}\ddot{\theta}_{caxy}e^{j(\theta_{baxy}+\theta_{caxy}-\theta_{caxy}+\pi/2)}$ (sixth term: acceleration of rotation)

$+Ge^{j(\theta_{gxy}-\pi-\theta_{caxy})}$ (seventh term: gravity acceleration component) (24)

The approximate expression is obtained by substituting the approximate conditions. Restriction conditions are given such that the revolution angular velocity $\dot{\theta}_{axy}$ and the rotation angular velocity $\dot{\theta}_{caxy}$ are very small vibration (±) around 0 so that $\theta_{axy}\approx 0$ and $\theta_{caxy}\approx 0$. Further, it is assumed that the scalar $r_{axy}$ changes very slightly so that $\dot{r}_{axy}$=finite value, $\ddot{r}_{axy}$=finite value, $\theta_{baxy}$ substantially satisfies $\pi/2-\pi/4 \le \theta_{baxy} \le \pi/2+\pi/4$.
Accelerometer Output:

$$\vec{A}_{cc(O-X_2Y_2)} = \vec{R}_{bxy(O-XY)}e^{j(-\theta_{caxy})}$$
$$\approx \ddot{r}_{axy}e^{j(0-0)}$$

(first term: optical axis direction movement)

$+r_{axy}\dot{\theta}_{axy}^2 e^{j(0-0+\pi)}$ (second term: centripetal force of revolution)

$+r_{axy}\ddot{\theta}_{axy}e^{j(0-0+\pi/2)}$ (third term: acceleration of revolution)

$+2\dot{r}_{axy}\dot{\theta}_{axy}e^{j(0-0+\pi/2)}$ (fourth term: Coriolis force)

$+r_{baxy}\dot{\theta}_{caxy}^2 e^{j(\theta_{baxy}+0+\pi)}$ (fifth term: centripetal force of revolution)

$+r_{baxy}\ddot{\theta}_{caxy}e^{j(\theta_{baxy}+0+\pi/2)}$ (sixth term: acceleration of rotation)

$+Ge^{j(\theta_{gxy}-\pi-0)}$ (seventh term: gravity acceleration component) (25)

This real part is the accelerometer output $A_{ccx2}$ in the $X_2$-axis direction, and the imaginary part is the accelerometer output $A_{ccy2}$ in the $Y_2$-axis direction. The above described polar coordinate system representation is decomposed into the $X_2$ component and the $Y_2$ component in the orthogonal coordinate system representation.
Accelerometer Output in the $X_2$-Axis Direction:

$\vec{A}_{ccx2(O-X_2Y_2)} \approx +\ddot{r}_{axy}$ (first term: optical axis direction movement)

$-r_{axy}\dot{\theta}_{axy}^2$ (second term: centripetal force of revolution)

$+r_{baxy}\dot{\theta}_{caxy}^2 \cos(\theta_{baxy}+\pi)$ (fifth term: centripetal force of rotation)

$+r_{baxy}\ddot{\theta}_{caxy}^2 \cos(\theta_{baxy}+\pi/2)$ (sixth term: acceleration of rotation)

$+G \cos(\theta_{gxy}-\pi)$ (seventh term: gravity acceleration component) (26)

In expression (26), only the first term $\ddot{r}_{axy}$ is needed for optical axis direction movement correction. The second term, the fifth term, the sixth term and the seventh term are components unnecessary for the optical axis direction movement correction, and unless they are erased, they become the error components when the acceleration $\ddot{r}_{axy}$ in the direction of the $X_2$-axis which is the optical axis. The second, the fifth, the sixth and the seventh terms can be erased by the similar method as the case of the next expression (27).

In order to delete the second term (centripetal force of revolution), the values of $r_{axy}$ and $\dot{\theta}_{axy}$ which included in the second term need to be obtained. $r_{axy}$ is substantially equal to the object side focal length $(1+\beta)f/\beta$ ($\beta$ represents an imaging magnification). The image pickup apparatus of recent years is equipped with the focus encoder which measures the moving position of the autofocus lens 140. Therefore, it is easy to calculate the object distance from the output value of the focus encoder, in the focus state. The result $r_{axy}$ is obtained. The value obtained from the next expression (27) is used as the revolution angular velocity $\dot{\theta}_{axy}$.
Accelerometer Output in the $Y_2$-Axis Direction:

$\vec{A}_{ccy2(O-X_2Y_2)} \approx jr_{axy}\ddot{\theta}_{axy}$ (third term: acceleration of revolution)

$+j2\dot{r}_{axy}\dot{\theta}_{axy}$ (fourth term: Coriolis force)

$+jr_{baxy}\dot{\theta}_{caxy}^2 \sin(\theta_{baxy}+\pi)$ (fifth term: centripetal force of rotation)

$+jr_{baxy}\ddot{\theta}_{caxy}\sin(\theta_{baxy}+\pi/2)$ (sixth term: acceleration of rotation)

$+jG \sin(\theta_{gxy}-\pi)$ (seventh term: gravity acceleration component) (27)

The respective terms of the accelerometer output $A_{ccy2(O-X_2Y_2)}$ in the $Y_2$-axis direction will be described. The third term $jr_{axy}\ddot{\theta}_{axy}$ is the component necessary for obtaining the revolution angular velocity $\dot{\theta}_{axy}$ desired to be obtained in the present embodiment, and the revolution angular velocity $\dot{\theta}_{axy}$ is obtained by dividing the third term with the known $r_{axy}$ and integrating the result. The fourth term $j2\dot{r}_{axy}\dot{\theta}_{axy}$ represents a Coriolis force. If the movement of the camera in the optical axis direction is small, $\dot{r}_{axy}\approx 0$ is established, and the fourth term can be ignored. The fifth term and the sixth term are the error components which are included in the accelerometer output $A_{ccy2(O-X_2Y_2)}$ since the accelerometer 121 cannot be disposed at the ideal principal point position A and is disposed at the point B.

The fifth term $jr_{baxy}\dot{\theta}_{caxy}^2 \sin(\theta_{baxy}+\pi)$ represents the centripetal force which occurs since the accelerometer 121 rotates around the principal point A. $r_{baxy}$ and $\theta_{baxy}$ are the coordinates of the point B at which the accelerometer 121 is mounted, and are known. $\dot{\theta}_{caxy}$ represents the rotation angular velocity, and is the value which can be measured with the angular velocity sensor 130 mounted on the camera. Therefore, the value of the fifth term can be calculated.

The sixth term $jr_{baxy}\ddot{\theta}_{caxy} \sin(\theta_{baxy}+\pi/2)$ represents the acceleration component when the accelerometer 121 rotates around the principal point A, and $r_{baxy}$ and $\theta_{baxy}$ are the coordinates of the point B at which the accelerometer 121 is mounted, and are known. $\ddot{\theta}_{caxy}$ can be calculated by differentiating of the value of the angular velocity sensor 130 mounted on the camera. Therefore, the value of the sixth term can be calculated.

The seventh term $jG \sin(\theta_{gxy}-\pi)$ is the influence of the gravity acceleration, and can be dealt as the constant in the approximate expression, and therefore, can be erased by filtering processing of a circuit.

As described above, the accelerometer output $A_{ccy2(O-X2Y2)}$ in the $Y_2$-axis direction includes unnecessary components for revolution angular velocity $\dot{\theta}_{axy}$ which is desired to be obtained in the present invention. However, it has become clear that by disposing the accelerometer 121 at the position where the unnecessary components become the minimum, the necessary revolution angular velocity $\dot{\theta}_{axy}$ can be obtained without correction calculation.

Similarly, from the accelerometer output $A_{ccx2(O-X2Y2)}$ in the $X_2$ direction, the movement velocity $\dot{r}_{axy}$ in the substantially optical axis direction of the camera is desired to be calculated. The first term $\ddot{r}_{axy}$ corresponds to the optical axis direction movement acceleration. The second term, the fifth term, the sixth term and the seventh term can be erased for the same reason as described with the accelerometer output $A_{ccy2(O-X2Y2)}$ in the $Y_2$-axis direction. However, by similarly disposing the accelerometer 121 at the position where the unnecessary components become the minimum, the movement velocity $\dot{r}_{axy}$ substantially in the optical axis direction of the camera can be obtained from the accelerometer output $A_{ccx2(O-X2Y2)}$ in the $X_2$ direction without correction calculation.

In embodiment 1, when the ratio of the revolution angular velocity to the rotation angular velocity is 0.1 or less, the revolution angular velocity is sufficiently small with respect to the rotation angular velocity, and therefore, the image stabilization calculation is simplified by performing only rotation movement correction, which leads to enhancement in speed, and reduction in power consumption.

Further, when exposure of shooting is started by fully depressing the release button not illustrated, the revolution angular velocity in real time is estimated by multiplying the ratio of the revolution angular velocity to the past rotation angular velocity by the rotation angular velocity in real time. Thereby, even if the output of the accelerometer 121 is disturbed by shutter shock and operation vibration of the camera at the time of shooting, use of a revolution acceleration value which is significantly erroneous can be prevented, and stable image blur correction is enabled.

In the shooting optical system of the present embodiment, the closest proximity is set to an equal-magnification, but the closest proximity is not limited to this, because even if the closest proximity is, for example, twice according to the specifications of the shooting optical system to which the present invention is applied, the sum of products of the error ratio function corresponding to each shooting imaging magnification is obtained between the shooting imaging magnification of twice to 0.0, whereby the position of the accelerometer 121 where the error components become the minimum can be obtained. Therefore, it is obvious that the effect of the content described in the present embodiment does not change irrespective of the shooting imaging magnification of the closest proximity of the shooting optical system.

Further, an angular movement and a parallel movement are newly and strictly modeled and expressed mathematically to be a rotation movement and a revolution movement, and thereby, in whatever state the two movement component states are, accurate image stabilization without a control failure can be performed. Further, since the accelerometer is disposed at the position where the error amount accompanying the change of the principal point position of the shooting optical system becomes the minimum, and therefore, accurate image stabilization corresponding to the change of the principal point position of the shooting optical system can be performed. Further, image stabilization is performed with the difference between the rotation angular velocity and the revolution angular velocity, and therefore, the calculation processing amount after difference calculation can be reduced. Further, the units of the rotation movement and the revolution movement are the same (for example: rad/sec), and therefore, calculation becomes easy. Further, the image movement in the image pickup surface of the image pickup device, and the optical axis direction movement can be represented by the same expression, and therefore, image movement correction calculation and the optical axis direction movement correction calculation can be performed at the same time.

Embodiment 2

Figure 19A:
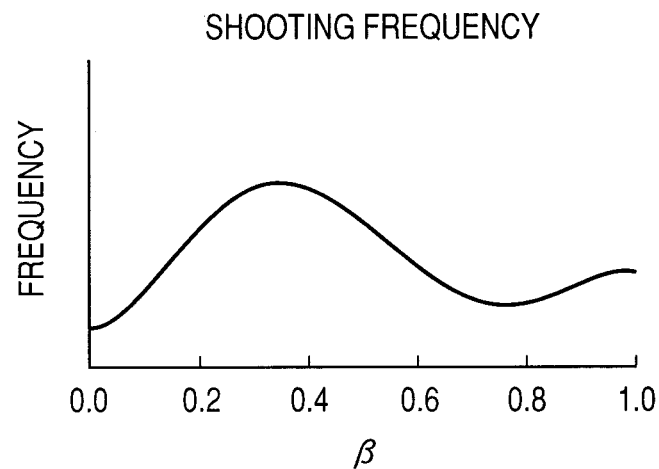
FIGS. 19A and 19B are diagrams illustrating error ratio functions and the like of accelerometer outputs according to embodiment 2.
Figure 19B:
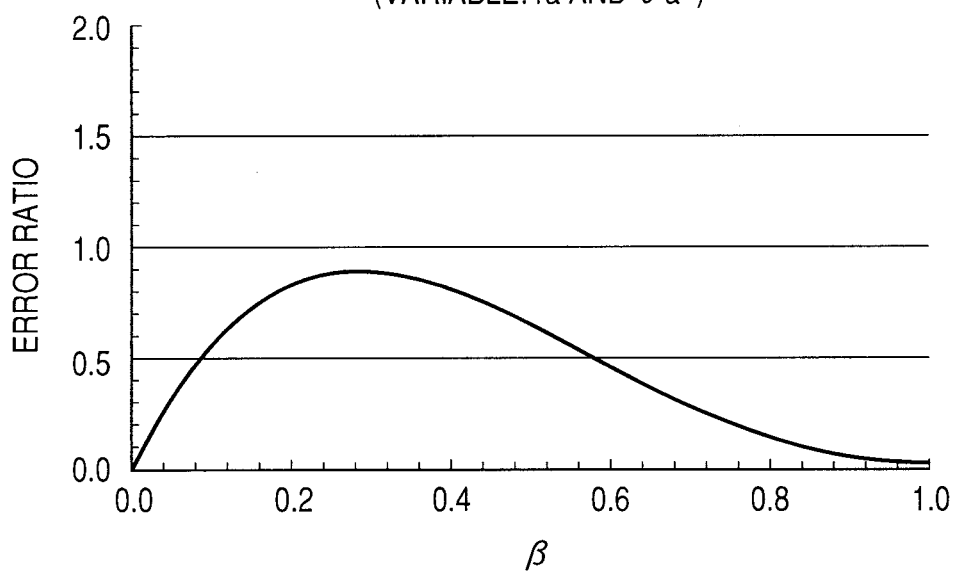

By using FIGS. 19A and 19B, embodiment 2 will be described. In embodiment 1, the error ratio at each shooting imaging magnification is obtained by using expression (33), and from the result of the sum of products of the value, the position of the accelerometer 121 where the error ratio becomes the minimum is obtained. However, in the present embodiment, the error ratio at each shooting imaging magnification obtained by using expression (33) is multiplied by a shooting frequency to weight.

Figure 20:
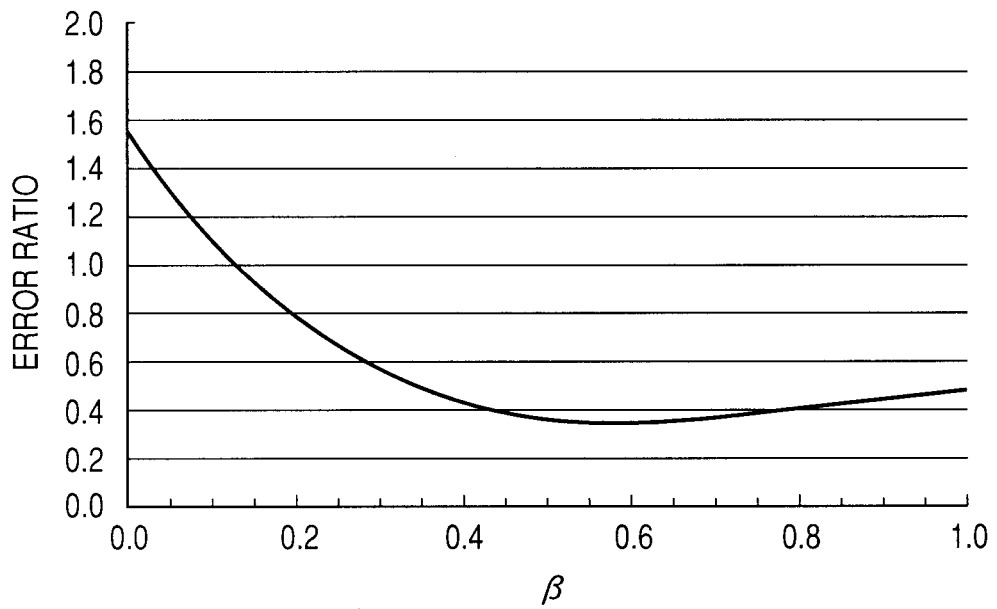
FIG. 20 is a diagram illustrating a position where the error ratio according to embodiment 2 becomes the minimum.

As described in embodiment 1, to the error ratio function at each shooting imaging magnification obtained by using expression (33), the shooting frequency at each shooting imaging magnification known as a result of the earnest study of the present applicant is multiplied. The shooting frequency is illustrated in FIG. 19A, and the result of multiplying the error ratio function when the accelerometer 121 is disposed at the shooting magnification β=0.5 by the shooting frequency is illustrated in FIG. 19B. FIG. 20 illustrates how the result of integrating the value at each shooting imaging magnification of (error ratio)×(shooting frequency) which is obtained as shown in FIG. 19B changes when the accelerometer 121 is disposed at each shooting imaging magnification.

As shown in FIG. 20, the error ratio becomes the minimum when the accelerometer 121 is disposed in the vicinity of the shooting imaging magnification β=0.6 as compared with the case where the accelerometer is disposed at the other shooting imaging magnifications. Therefore, the error components included in the output of the accelerometer 121 can be minimized by disposing the accelerometer 121 in the vicinity of the shooting imaging magnification β=0.6 of the shooting optical system 105, and therefore, the correction calculating time of the output of the accelerometer 121 becomes unnecessary. Thereby, accurate blur correction can be made.

Figure 21:
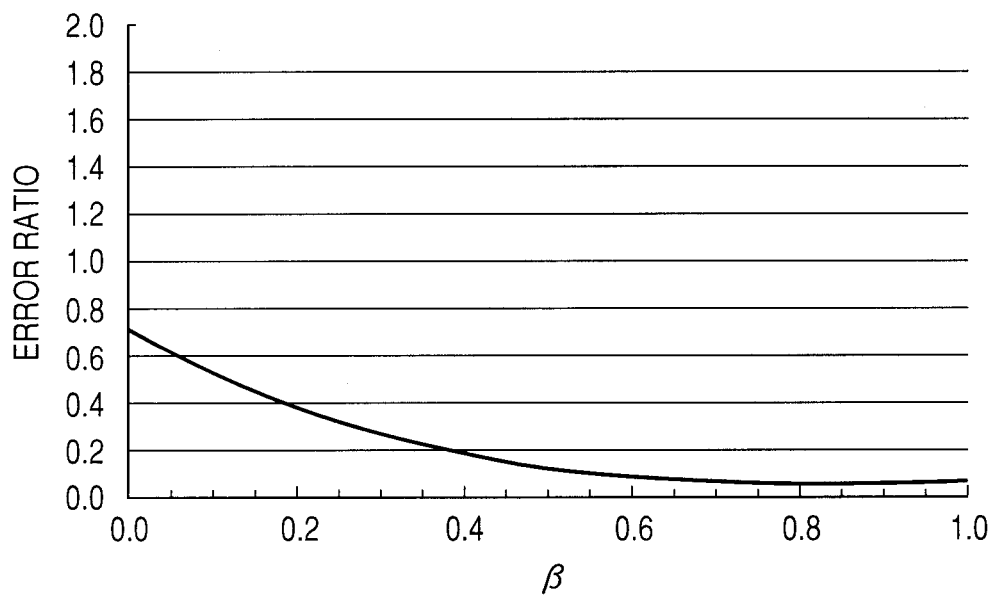
FIG. 21 is a diagram illustrating a position where an error ratio according to a modified example of embodiment 2 becomes the minimum.

Incidentally, the case where the error ratio function at each shooting imaging magnification obtained by using expression (33) is weighted by the effective amount of a parallel movement at each shooting imaging magnification is considered. FIG. 21 illustrates how the result of integrating the value at each shooting imaging magnification of (error ratio)×(parallel movement effective amount) changes when the accelerometer 121 is disposed at each shooting imaging magnification. As shown in FIG. 21, when the accelerometer 121 is disposed in the vicinity of the shooting imaging magnification β=0.8, the error ratio becomes the minimum as compared with the case where it is disposed at the other shooting imaging magnifications. Therefore, the error components included in the output of the accelerometer 121 can be minimized by disposing the accelerometer 121 in the vicinity of the shooting imaging magnification β=0.8 of the shooting optical system 105, and therefore, the correction calculating time of the output of the accelerometer 121 becomes unnecessary. Thereby, accurate blur correction can be made.

As described above, by weighting the error ratio with the shooting frequency and the effective amount of a parallel movement, the accelerometer 121 can be disposed at the minimum position which is more suitable for the use of the camera of a photographer. It goes without saying that by weighting the error ratio with the value obtained by multiplying the shooting frequency and the effective amount of a parallel movement, the accelerometer 121 also can be disposed at the position where the error ratio is the minimum.

Embodiment 3

By using FIGS. 22A and 22B, embodiment 3 will be described. The same flow as in FIGS. 7A and 7B according to embodiment 1 is included. Therefore, the same reference numerals and characters are used for the same flow, and the description will be omitted.

Figure 22B:
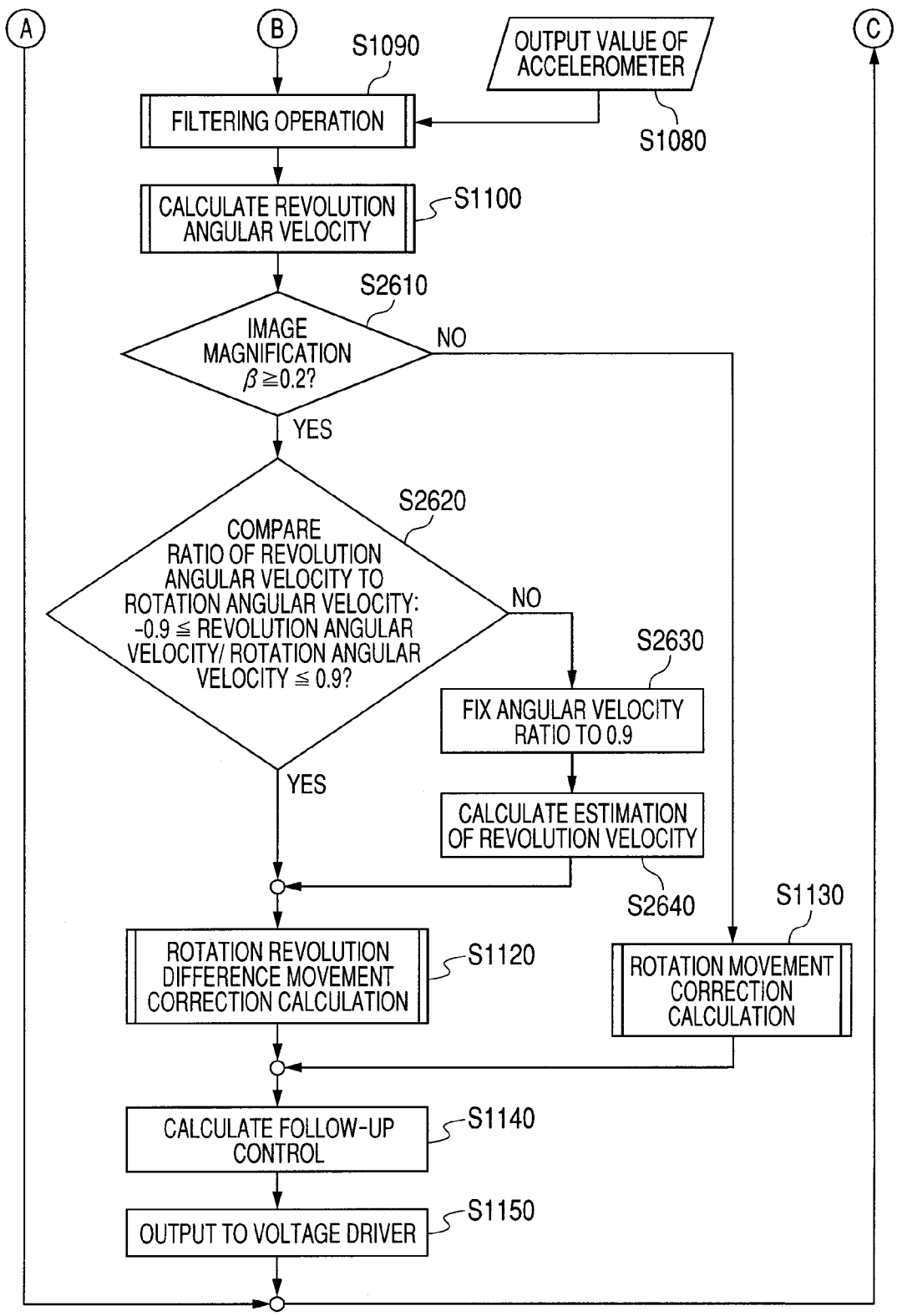
FIG. 22 is composed of FIGS. 22A and 22B are flowcharts illustrating an operation of embodiment 3.
Figure 23:
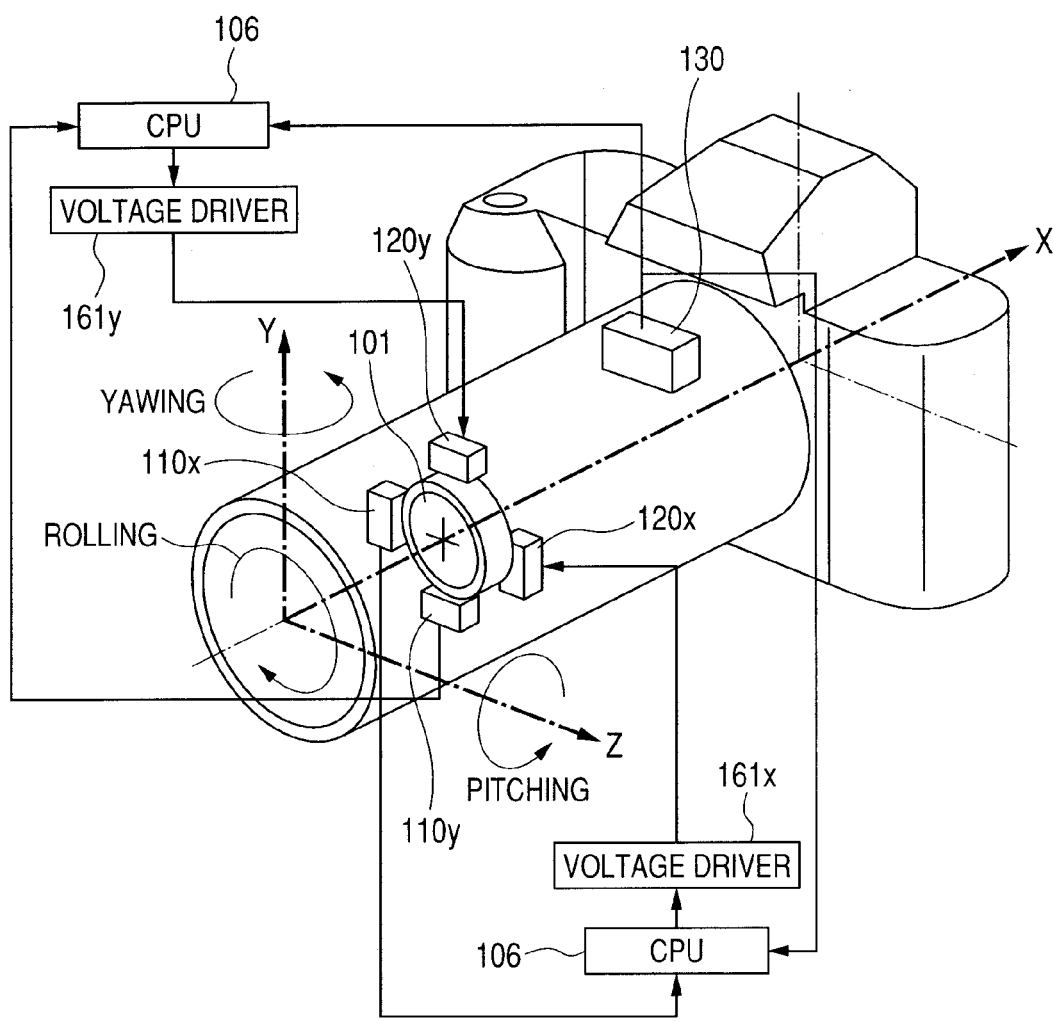
FIG. 23 is a view illustrating an image stabilization apparatus of a camera of a conventional example.
Figure 24A:
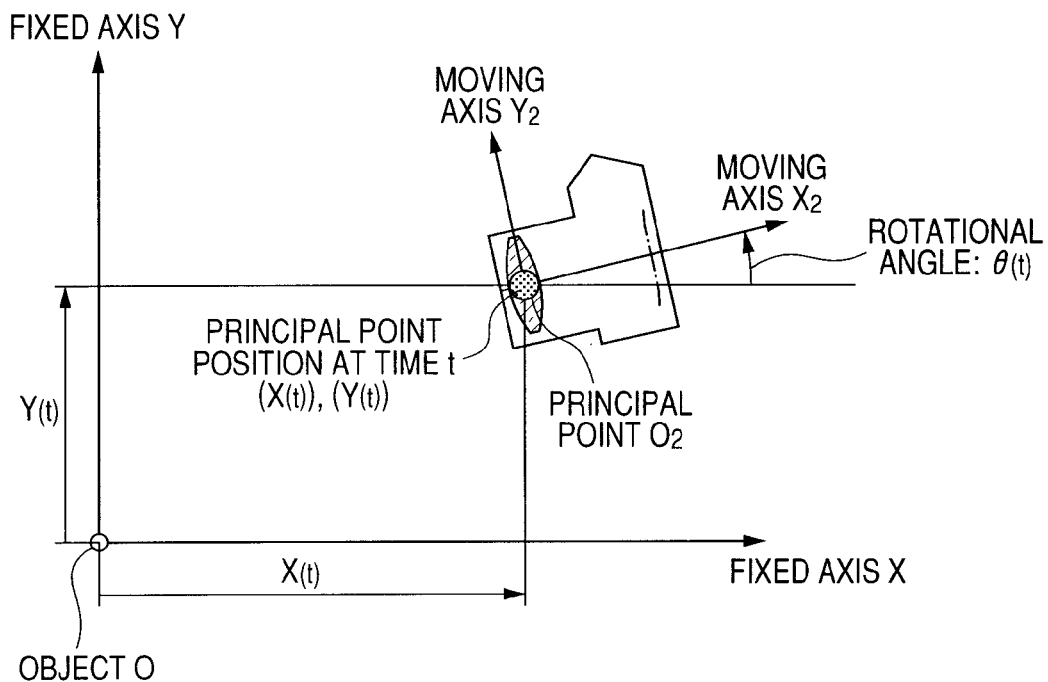
FIGS. 24A and 24B are diagrams illustrating definitions of an object position and an object velocity in an ordinary two-dimensional coordinate system.
Figure 24B:
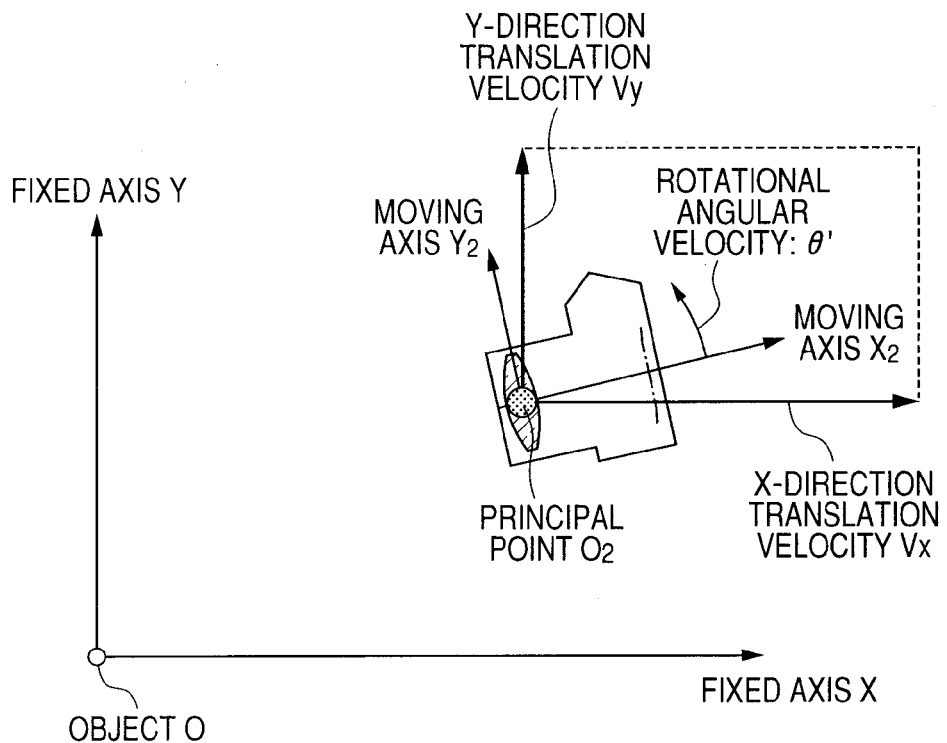
Figure 25:
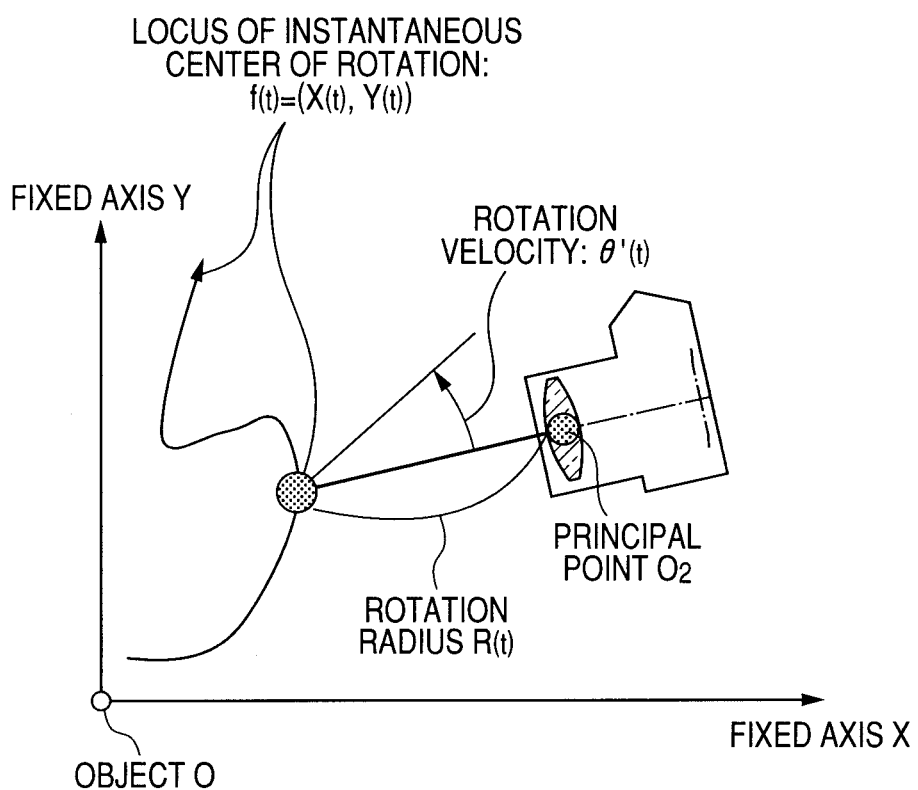
FIG. 25 is a diagram illustrating a definition of an ordinary locus of instantaneous center of rotation.

After revolution angular velocity calculation of S1100 of FIGS. 22A and 22B, the flow proceeds to S2610. In S2610, it is determined whether the imaging magnification of shooting is 0.2 or more (predetermined value or more). In the case of 0.2 or more, the flow proceeds to S2620, and in the case of less than 0.2 (less than the predetermined value), the flow proceeds to S1130. In S1130, rotation movement correction calculation is performed as in embodiment 1.

In S2620, it is determined whether or not the revolution angular velocity with respect to the rotation angular velocity is between −0.9 and +0.9 (predetermined value). If it is within ±0.9, the flow proceeds to S1120. When it is less than −0.9 or exceeds +0.9, the flow proceeds to S2630.

In S2630, the angular velocity ratio is fixed (stored) to the constant (specified constant) of 0.9, and in the next S2640, estimation of the present revolution angular velocity is calculated by multiplying the rotation angular velocity obtained in real time by the constant angular velocity ratio of 0.9, and the flow proceeds to the next S1120. In S1120, the rotation revolution difference movement correction calculation is performed as in embodiment 1.

In embodiment 3, when the imaging magnification is less than 0.2, the revolution angular velocity is sufficiently small with respect to the rotation angular velocity, and therefore, the image stabilization calculation is simplified by only performing rotation movement correction, which leads to enhancement in speed and reduction in power consumption. Further, the ratio of the revolution angular velocity to the rotation angular velocity rarely exceeds one, and when the ratio exceeds ±0.9, erroneous excessive correction is prevented by fixing the ratio to the constant 0.9.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-140255, filed Jun. 11, 2009, which is hereby incorporated by reference herein in its entirety.

The invention claimed is:

1. An image stabilization apparatus, comprising:
a shooting optical system that shoots an object, in which a principal point of the shooting optical system moves to a second principal point position from a first principle position in an optical axis direction of the shooting optical system;
an acceleration detector that detects an acceleration which is applied to the image stabilization apparatus and outputs the acceleration and is disposed between the first principal point position and the second principal point position in the optical axis direction of the shooting optical system;
an angular velocity detector that detects an angular velocity applied to the image stabilization apparatus and outputs the angular velocity;
a calculation unit that calculates a position of the principal point in the shooting optical system; and
a controlling unit that performs image stabilization control based on the angular velocity detected by the angular velocity detector, the acceleration detected by the acceleration detector, and the position of the principal point calculated by the calculation unit.

2. The image stabilization apparatus according to claim 1, further comprising:
a magnification calculation unit that calculates an imaging magnification of the shooting optical system;
wherein the acceleration detector is disposed at a position where the imaging magnification is about 0.5.

3. The image stabilization apparatus according to claim 1, wherein the acceleration detector is provided on a frame member which holds a lens constituting the shooting optical system, or on a stop member disposed in an optical system.

4. The image stabilization apparatus according to claim 1, further comprising: a first angular velocity calculation unit that calculates a first angular velocity component around the position of the principal point calculated by the calculation unit based on an output of the angular velocity detector; and a second angular velocity calculation unit that calculates a second angular velocity component around a point relating to the object based on an output of the angular velocity detector and a calculation result of the first angular velocity calculation unit, and corrects the second angular velocity component based on the principal point position, wherein the controlling unit performs image stabilization control based on a difference between the first angular velocity component and the corrected second angular velocity component.

5. An image pickup apparatus, comprising an image stabilization apparatus according to claim 4.

6. An image stabilization apparatus, comprising:
a shooting optical system that shoots an object;
an angular velocity detector that detects an angular velocity applied to the image stabilization apparatus and outputs the angular velocity;
an acceleration detector that detects an acceleration applied to the image stabilization apparatus and outputs the acceleration, the acceleration detector being disposed between a principal point position in a case of proximity shooting and a principal point position in a case of infinity shooting of the shooting optical system;
a rotation angular velocity calculation unit that calculates a rotation angular velocity component around the principal point of the shooting optical system based on an output of the angular velocity detector;

a revolution angular velocity calculation unit that calculates a revolution angular velocity component around the object based on the output of the acceleration detector and an calculation result of the rotation angular velocity calculation unit; and a controlling unit that performs image stabilization control based on a difference between the rotation angular velocity component and the revolution angular velocity component.

7. The image stabilization apparatus according to claim 6, wherein when a distance between the principal point position of the shooting optical system in a case of proximity shooting and the acceleration detector in an optical axis direction is set as Xba, a distance between the optical axis of the shooting optical system and the acceleration detector in a direction perpendicular to the optical axis is set as Yba, $\tan(\theta ba)=Yba/Xba$ is set, and an error component included in an output of the acceleration detector which changes according to an imaging magnification of the shooting optical system is defined as the error ratio function $f(\theta ba)$, the acceleration detector is disposed in a vicinity of a position at the distance Xba where a sum of products of the error ratio function $f(\theta ba)$ becomes a minimum between the principal point position in a case of proximity shooting and a principal point position in a case of infinity shooting of the shooting optical system, when the distance Yba is constant.

8. The image stabilization apparatus according to claim 7, wherein the error ratio function $f(\theta ba)$ is weighted by an effective amount of a parallel movement of the image stabilization apparatus, and the acceleration detector is disposed in a vicinity of a position at the distance Xba where a sum of products of the weighted error ratio function $f(\theta ba)$ becomes a minimum between the principal point position in a case of proximity shooting and the principal point position in a case of infinity shooting of the shooting optical system.

9. The image stabilization apparatus according to claim 6, wherein the error ratio function $f(\theta ba)$ is weighted by a shooting frequency of an image pickup apparatus having the shooting optical system, and the acceleration detector is disposed in a vicinity of a position at the distance Xba where a sum of products of the weighted error ratio function $f(\theta ba)$ becomes a minimum between the principal point position in a case of proximity shooting and the principal point position in a case of infinity shooting of the shooting optical system.

10. The image stabilization apparatus according to claim 6, further comprising a rotation revolution difference calculation unit that calculates a rotation revolution difference value based on the difference between the rotation angular velocity component and the revolution angular velocity component, wherein the controlling unit performs image stabilization control based on the rotation revolution difference value.

11. The image stabilization apparatus according to claim 10, wherein the controlling unit performs image stabilization control based on the rotation revolution difference value when an imaging magnification of the shooting optical system is a predetermined value or more, and performs image stabilization control based on the rotation angular velocity component when the imaging magnification of the shooting optical system is less than the predetermined value.

12. The image stabilization apparatus according to claim 6, further comprising a rotation revolution angular velocity ratio calculation unit that calculates a rotation revolution angular velocity ratio that is a ratio of the revolution angular velocity component to the rotation angular velocity component, wherein the revolution angular velocity calculation unit calculates estimation of the revolution angular velocity component by a product of a rotation angular velocity component calculated in real time and the rotation revolution angular velocity ratio calculated by the rotation revolution angular velocity ratio calculation unit.

13. The image stabilization apparatus according to claim 12, wherein the rotation revolution angular velocity ratio calculation unit sets the rotation revolution angular velocity ratio as a specified constant when the rotation revolution angular velocity ratio exceeds a predetermined value.

14. The image stabilization apparatus according to claim 12, wherein the controlling unit performs image stabilization control based on the rotation revolution difference value when the rotation revolution angular velocity ratio is larger than a predetermined value, and performs image stabilization control based on the rotation angular velocity component when the rotation revolution angular velocity ratio is equal to or smaller than the predetermined value.

15. The image stabilization apparatus according to claim 6, further comprising:

an optical axis direction acceleration detector that detects an optical axis direction component of the acceleration applied to the image stabilization apparatus; and an optical axis direction movement correction controlling unit that corrects an image blur caused by an optical axis direction component of a movement applied to the image stabilization apparatus, wherein the optical axis direction movement correction controlling unit performs optical axis direction movement correction control based on the optical axis direction component of the acceleration.

16. An image pickup apparatus, comprising the image stabilization apparatus according to claim 6.

* * * * *